United States Patent
Benner et al.

(10) Patent No.: US 10,148,356 B2
(45) Date of Patent: Dec. 4, 2018

(54) DATA TRANSFER OVER BI-DIRECTIONAL LINKS LEVERAGING COUNTER-PROPAGATING BACK CHANNEL FOR LOW-LATENCY RESPONSES

(71) Applicant: International Business Machines Corporation, Armonk, NY (US)

(72) Inventors: Alan F. Benner, Poughkeepsie, NY (US); Douglas M. Freimuth, New York, NY (US); Benjamin G. Lee, New York, NY (US); Fabrizio Petrini, Palo Alto, CA (US); Laurent Schares, Pleasantville, NY (US); Clint L. Schow, Santa Barbara, CA (US); Mehmet Soyuer, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 15/267,282

(22) Filed: Sep. 16, 2016

(65) Prior Publication Data

US 2018/0083706 A1    Mar. 22, 2018

(51) Int. Cl.
*H04J 14/02* (2006.01)
*H04B 10/2581* (2013.01)
*H04B 10/27* (2013.01)

(52) U.S. Cl.
CPC ......... *H04B 10/2581* (2013.01); *H04B 10/27* (2013.01); *H04J 14/0227* (2013.01)

(58) Field of Classification Search
CPC .. H04B 10/2581; H04B 10/27; H04J 14/0227
See application file for complete search history.

(56) References Cited

U.S. PATENT DOCUMENTS 7,684,711 B2   3/2010 Desbruslais et al.
8,121,478 B2   2/2012 Kash et al.
(Continued)

FOREIGN PATENT DOCUMENTS

KR    101064414 B1    9/2011
WO    2012103819 A2    8/2012
WO    2015127780 A1    9/2015

OTHER PUBLICATIONS

Wang, et al., "A Bidirectional 2×2 Photonic Network Building-Block for High-Performance Data Centers", Optical Fiber Communication Conference/National Fiber Optic Engineers Conference 2011, OSA Technical Digest (CD) (Optical Society of America, Mar. 2011, pp. 1-3, paper OTuH4.
(Continued)

*Primary Examiner* — Tesfaldet Bocure
(74) *Attorney, Agent, or Firm* — Scully, Scott, Murphy & Presser, P.C.; Daniel P. Morris, Esq.

(57) ABSTRACT

A method for transmitting data between a first device and a second device over a communication link includes transmitting, by the first device, data of a first type using one or more first channels, receiving, by the second device, the data of the first type from the first device using the one or more first channels, generating, by the second device, data of a second type based on the data of the first type, and transmitting, by the second device, the generated data of the second type using one or more second channels. The data of the first type and the data of the second type are different. The one or more second channels are channels dedicated to transmit the data of the second type.

13 Claims, 20 Drawing Sheets

(56) References Cited

U.S. PATENT DOCUMENTS

| | | | |
|---|---|---|---|
| 8,489,949 B2 | 7/2013 | Tiedemann, Jr. et al. | |
| 8,583,132 B2 | 11/2013 | Gorokhov et al. | |
| 8,676,004 B1 | 3/2014 | Urata et al. | |
| 8,965,203 B1 | 2/2015 | Vahdat et al. | |
| 9,136,968 B2 | 9/2015 | Lee et al. | |
| 2004/0184806 A1 | 9/2004 | Lee et al. | |
| 2005/0013263 A1 | 1/2005 | Kim et al. | |
| 2007/0003288 A1 | 1/2007 | Tong et al. | |
| 2007/0292135 A1* | 12/2007 | Guo ................... | H04B 10/1143 398/106 |
| 2011/0299450 A1* | 12/2011 | Ye ........................ | H04L 1/1628 370/312 |
| 2013/0107846 A1* | 5/2013 | Chen .................... | H04L 1/1685 370/329 |
| 2014/0064206 A1* | 3/2014 | Bao ................... | H04W 72/1278 370/329 |
| 2014/0064304 A1* | 3/2014 | Hung .................. | H04B 10/272 370/535 |
| 2014/0334419 A1* | 11/2014 | Yang .................... | H04L 1/1861 370/329 |

OTHER PUBLICATIONS

List of IBM Patents or Patent Applications Treated as Related, dated Sep. 16, 2016, 2 pages.
Office Action dated Apr. 2, 2018, received in a related U.S. Appl. No. 15/267,298.

* cited by examiner

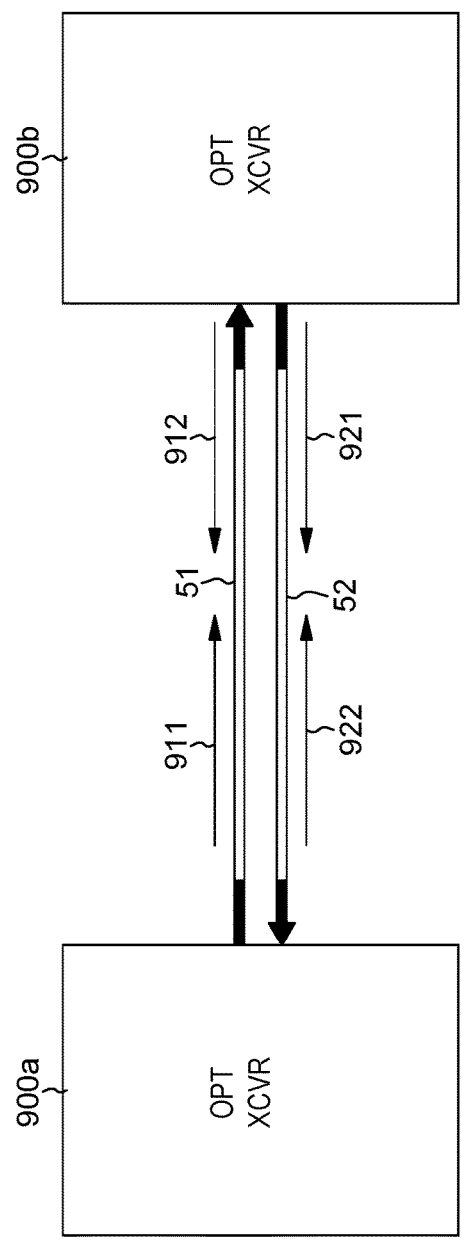

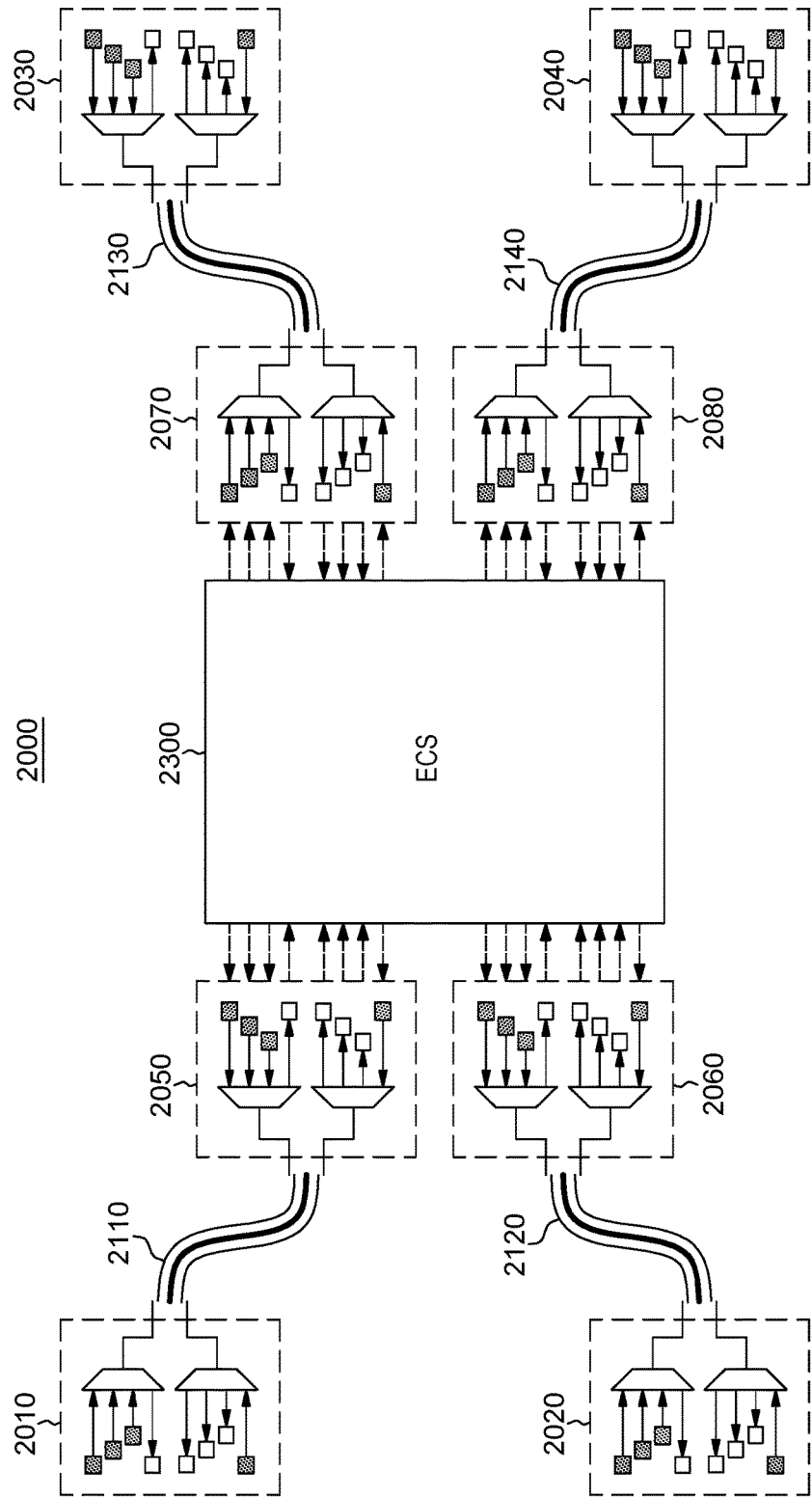

US 10,148,356 B2

DATA TRANSFER OVER BI-DIRECTIONAL LINKS LEVERAGING COUNTER-PROPAGATING BACK CHANNEL FOR LOW-LATENCY RESPONSES

This invention was made with Government support under Contract No.: W911NF-12-2-0051 awarded by Defense Advanced Research Projects Agency (DARPA). The Government has certain rights in this invention.

FIELD

The present disclosure relates to an optical communication system, and more particularly to a method for assigning a dedicated backward channel for low latency responses.

BACKGROUND

With a traditional network, severe latency penalties may be incurred when an acknowledgement or a simple response to a message must ascend all the way through stack(s) to a software level, then pass through aggregation queues and transmitter buffers, get routed back through a buffered packet-switched network, all before reaching a node which is expecting it.

Thus, due to such inefficiencies in the traditional network, a sending node may incur severe latency, potentially delaying its program execution until the response is received; often no response may be received resulting in a timeout and retransmission. In addition, a responding node's transmitter resources may be wasted, sending the often small-sized response messages. In some case, the network is flooded with additional IP packets, causing congestion and adding further delays. The efficiencies would be greatly improved if the sending node could be provided with a message's status in a more timely fashion.

SUMMARY

In one aspect there is provided a method for transmitting data between a first device and a second device over a communication link. The method includes: transmitting, by the first device, data of a first type using one or more first channels; receiving, by the second device, said data of the first type from the first device using the one or more first channels; generating, by the second device, data of a second type based on said data of the first type; and transmitting, by the second device, said generated data of the second type using one or more second channels. Said data of the first type and said data of the second type are different. The one or more second channels are channels dedicated to transmit said data of the second type.

In another aspect there is provided a method for transferring data between a first device and a second device over two or more communication links. The communication links includes first and second communication links. The method includes: transmitting, by the first device, one data of a first type using one or more first channels over the first communication link; receiving, by the second device, said one data of the first type using the one or more first channels over the first communication link; generating, by the second device, one data of a second type based on said one data of the first type received using the one or more first channels over the first communication link; transmitting, by the second device, said one data of the second type using one or more second channels over the first communication link; receiving, by the first device, said one data of the second type using the one or more second channels over the first communication link; and transmitting, by the second device, another data of a first type using one or more third channels over the second communication link.

BRIEF DESCRIPTION OF THE DRAWINGS

FIG. 9A is a diagram illustrating a bidirectional communication between optical transceivers according to a non-limiting exemplary embodiment of the present disclosure;

FIG. 11 illustrates an example of a bidirectional communication network for showing how optical transceivers communicate through an electronic circuit switch (ECS) according to a non-limiting exemplary embodiment of the present disclosure;

DETAILED DESCRIPTION OF THE EMBODIMENTS

Figure 1:
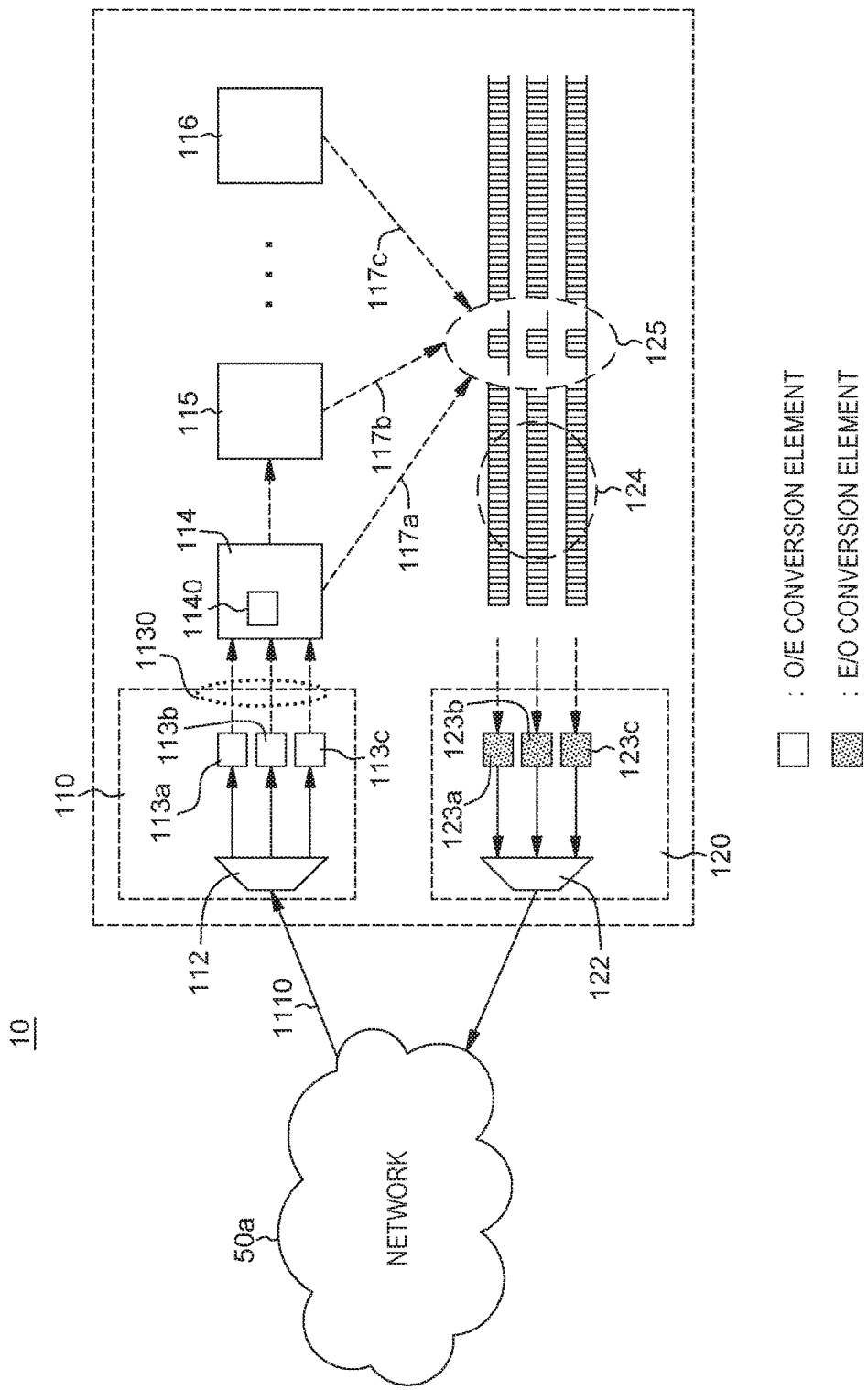
FIG. 1 illustrates an example of an existing optical transceiver.

Like reference numerals may refer to like elements throughout the written descriptions and drawings.

FIG. 1 illustrates an example of an existing optical transceiver 10.

Referring to FIG. 1, the optical transceiver 10 may include a receiver module 110 and a transmitter module 120. The receiver module 110 may be configured to receive one or more incoming optical signals 1110 from a transmitting node (not shown) over a communication network 50a and convert the received optical signals 1110 to one or more electrical signals 1130, respectively. To this end, the receiver module 110 may include an element 112 (e.g., a multiplexing-and-demultiplexing unit or array waveguide gratings (AWG)) for demultiplexing the incoming optical signals 1110 in terms of channels, a plurality of optical-to-electrical (O/E) conversion elements (e.g., photodiode, photodetector, etc.) 113a to 113c for converting the optical signals 1110 to the one or more electrical signals 1130, a buffer unit 114 for receiving and buffering the converted electrical signals 1130 as data 1140, a data verifying unit 115 for verifying the data 1140 output from the buffer unit 114 is correct, and a processing unit 116 for performing operations, e.g., an atomic operation such as "store min" operation, "read-modify-write" operation, "fetch-and-add" operation, "fetch-and-OR" operation, etc. For example, data 117a to 117c respectively generated from the buffer unit 114, the data verifying unit 115, and the processing unit 116 may be sent back to the transmitting node (not shown) using the transmitter module 120, as shown in FIG. 1. Here, the "data" (e.g., 1140) included in the optical signal 1110 (or the electrical signals 1130) may include payload information with a relatively large size, and the data 117a to 117c sent back to the transmitting node in response to the receipt of the data (e.g., 1140) from the transmitting node may be control data or a control message(s) which is more sensitive to latency than the data (e.g., 1140). Thus, a low latency is required for transmission of the control data (e.g., 117a to 117c). For example, the data 117a to 117c may include, but are not limited to, acknowledgement (ACK) messages, flow control packets, control plane information, and/or simple memory operation results, or the like. For example, if there is no available buffer space, the buffer unit 114 may send a control message (e.g., 117a) of, e.g., "buffers full" to the transmitting node. In addition, the data verifying unit 115 may send a control message (e.g., 117b) of, e.g., "retransmit" to the transmitting node if one or more errors occur in the received data 1140 from the buffer unit 114. In addition, the processing unit 116 may send a control message (e.g., 117c) of, e.g., "send result" once its processing is completed. However, in some cases, the control messages 117a to 117c may be queued in the transmitter module 120, as shown in FIG. 1, while waiting for opportunity to be inserted between larger data stream 124, as a control message block 125. This may result in unnecessary delay or latency for the control messages 117a to 117c. For example, in a certain optical transceiver (e.g., InfiniBand® which supports 4 channels×25 Gb/s), latency can be increased up to, e.g., 80 ns for handling a control message of 2 kB. In FIG. 1, a plurality of E/O conversion elements 123a to 123c (e.g., directly modulated laser, external modulator, etc.) of the transmitting unit 120 may be used for transmitting the data stream 124 and the control message block 125 through an element 122 (e.g., multiplexing-and-demultiplexing unit or AWG) over the network 50a. The optical transceiver 10 may transmit and receive data using two different communication links in the network 50a. For example, the optical transceiver 10 may receive data over one communication link of the network 50a, and transmit data including data streams 124 and control messages 125 over another communication link of the network 50a.

Figure 2:
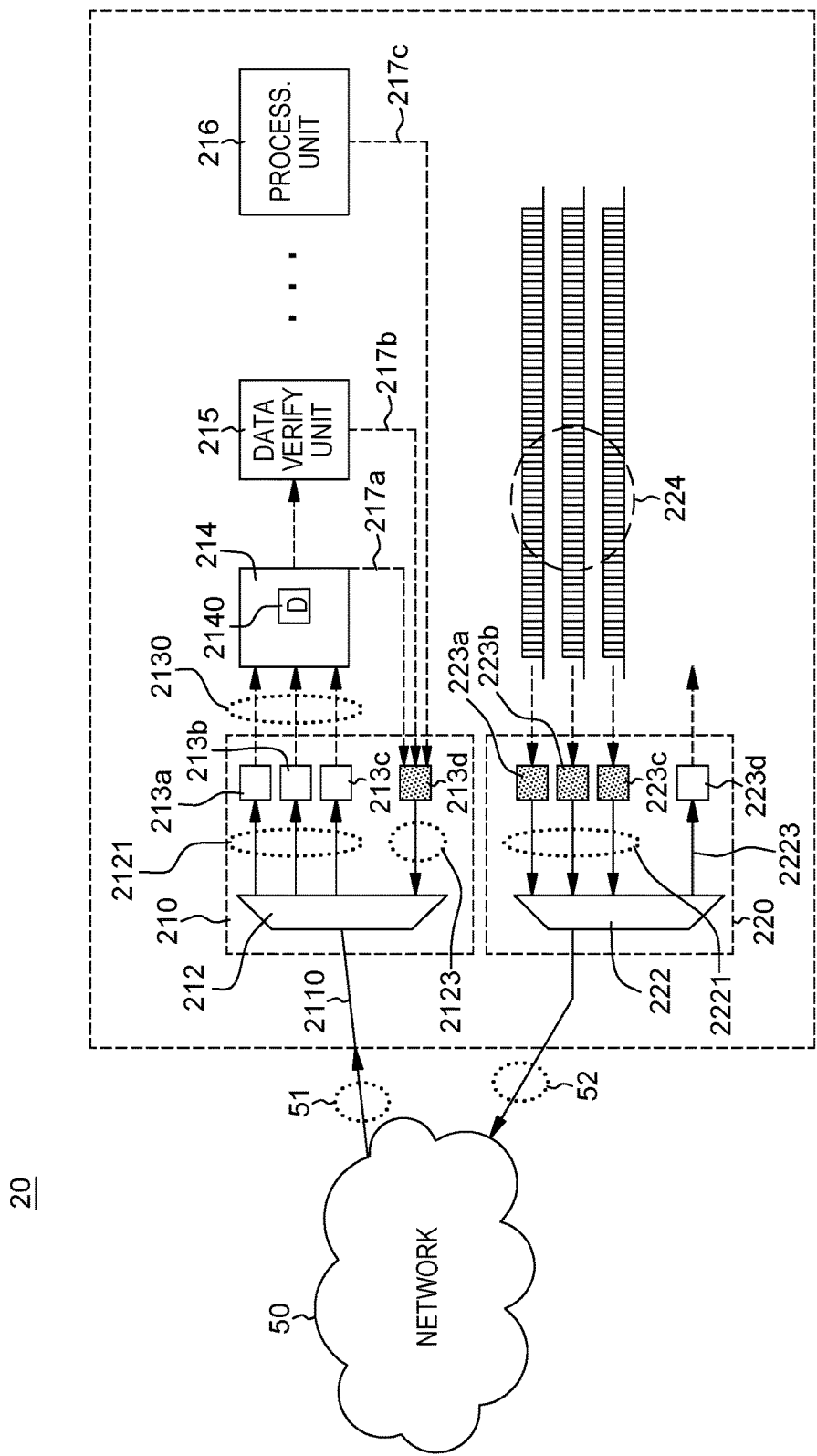
FIG. 2 is a diagram illustrating an optical transceiver according to a non-limiting exemplary embodiment of the present disclosure.

FIG. 2 is a diagram illustrating an optical transceiver 20 according to a non-limiting exemplary embodiment of the present disclosure.

Referring to FIG. 2, the optical transceiver 20 may include a receiver module 210 and a transmitter module 220. In one embodiment, the receiver module 210 (or the transmitter module 220) may receive (or transmit) data through a communication network 50. In one embodiment, the communication network 50 may include one or more communication links including a first communication link 51 and a second communication link 52. In one embodiment, the communication network 50 may include, but is not limited to, an optical fiber(s), an optical waveguide(s), an optical switch(es) such as an optical circuit switch (OCS), etc., an electrical cable(s), a printed circuit board (PCB) traces, an electronic switch(es) such as an electronic circuit switch (ECS), an electronic packet switch (EPS) router, etc., an O/E converter, an E/O converter, or the like.

In one embodiment, the receiver module 210 may receive data (e.g., 2110) using the first communication link 51 of the network 50, and the transmitter 220 may transmit data (e.g., 224) using the second communication link 52 of the network 50. The receiver module 210 may include an element 212 (e.g., multiplexing-and-demultiplexing unit or AWG) for demultiplexing incoming optical signals 2110, which are transmitted from a transmitting node (not shown) through the first communication link 51, into a plurality of channels 2121, a plurality of O/E conversion elements 213a to 213c (e.g., photodiode, photodetector, etc.) for converting the optical signals 2110 to one or more electrical signals 2130, respectively. In one embodiment, the optical signals 2110 may include, but are not limited to, a data message(s), payload information, a request message(s) to a receiving node (not shown), and a query message(s) which are, hereinafter, referred to as "data of a first type" for the sake of description.

The optical transceiver 20 may further include, but is not limited to, a buffer unit 214 for receiving and buffering the converted electrical signals 2130 as data 2140, a data verifying unit 215 for verifying that the data (e.g., 2140) output from the buffer unit 214 is correct, and a processing unit 216 for performing operations, e.g., an atomic operation such as "store min" operation, "read-modify-write" operation, "fetch-and-add" operation, "fetch-and-OR" operation, etc. In addition, control messages may be generated using, e.g., the buffer unit 214, the data verifying unit 215, and the processing unit 216, to be transmitted to the transmitting node (not shown). For example, the control messages may include ACK messages (e.g., 217a and 217b) generated by the buffer unit 214 and the data verifying unit 215, and a message (e.g., 217c) including a processing result in the processing unit 216. In one embodiment, the control messages may further include, but are not limited to, flow control messages, response message(s) to the request, query, and/or data messages, or the like, which are, hereinafter, referred to as "data of a second type" for the sake of description. Further, in one embodiment, the response messages may include, but is not limited to, ACK messages for the buffer reservation request, and the connection request. The query message may include a buffer query.

In one embodiment, when the data of the first type is the buffer query, the data of the second type may be the number of free buffers. In one embodiment, when the data of the first type is a buffer reservation request, the data of the second type may be a buffer reservation ACK. In one embodiment, when the data of the first type is data payload, the data of the second type may be a receive ACK. In one embodiment, when the data of the first type is the connection request, the data of the second type may be the connection complete ACK.

In one embodiment, to transmit the data of the second type (e.g., 217a to 217c) with lower latency, one or more dedicated channels may be used. For example, referring to FIG. 2, a dedicated channel 2123 corresponding to an E/O conversion element 213d may be used to transmit the data of the second type (e.g., 217a to 217c) to the transmitting node (not shown). In addition, the output of the E/O conversion element 213d may be demultiplexed through the element 212 to be transmitted back to the transmitting node (not shown) over the first communication link 51 of the network 50. Hereinafter, the channel 2123 may be referred to as a "backward channel" or a "back-channel" since it carries data of the second type (e.g., 217a to 217c) in an opposite direction to other forward channels 2121 in the first communication link 51. Thus, in an exemplary configuration of the receiver module 210 shown in FIG. 2, the data of the second type (e.g., 217a to 217c) can be immediately transmitted, when they are generated, without waiting for the transmission opportunity unlike the receiver module 110 shown in FIG. 1.

In one embodiment, the transmitter module 220 may transmit data of the first type to a (or the) receiving node (not shown) using forward channels 2221 which are exclusive to the dedicated backward channel 2123. Also, a channel 2223 may be used to receive data of the second type transmitted from a (or the) transmitting node (not shown) over the network 50. To this end, the optical transceiver 20 may include, but is not limited to, a plurality of E/O conversion elements 223a to 223c for converting electrical signals including data (e.g., data of the second type) to corresponding optical signals, and an element 222 (e.g., multiplexing-and-demultiplexing unit or AWG) for multiplexing (e.g., combining) the optical signals to transmit them over the network 50. The transmitter module 220 may further include an O/E conversion element 223d corresponding to the channel 2223.

In one embodiment, the channels 2121 and 2221 are referred to as "forward channels" or "co-propagating channels" since they carry a relatively large size data (e.g., data of the first type) requiring higher bandwidth.

Thus, due to the dedicated backward channel(s) (e.g., 2123 and 2223), the optical transceiver 20 of FIG. 2 can provide low and/or deterministic latency to result in following benefits.

Firstly, the backward channel(s) may enable immediate responses to link error control and flow control mechanisms. For example, ACK messages when data is verified (e.g., no errors found) and/or when data is successfully handled (e.g., buffers at a receiver are available) may be transmitted to a transmitting node using the dedicated backward channel(s) and thus, the transmitting node may have immediate knowledge for the status of a receiving node including the optical transceiver 20.

Secondly, the backward channel(s) may enable quick feedback from memory operations with simple responses, and thus, penalty for cache misses and overhead of certain memory transactions can be reduced.

Thirdly, the backward channel(s) may provide better fault tolerance by alerting nodes of potential network hardware failures more quickly.

In one embodiment, when the dedicated backward channel(s) are not in use, they may be used for transmission of other data (e.g., data of the first type) using, e.g., analog signal formats.

Figure 3:
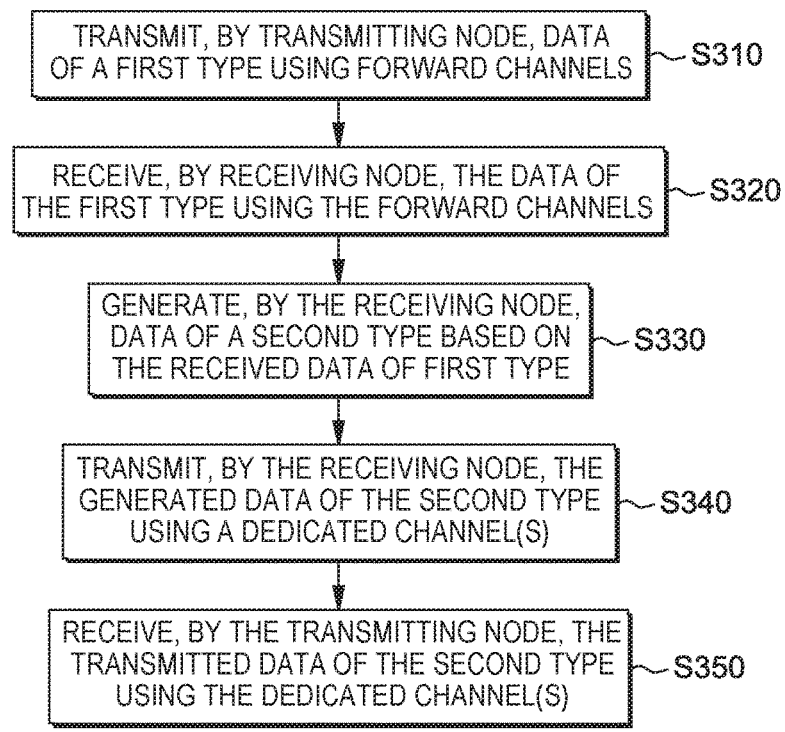
FIG. 3 is a flowchart illustrating a method for transmitting data between a transmitting node and a receiving node over a communication network according to a non-limiting exemplary embodiment of the present disclosure.

FIG. 3 is a flowchart illustrating a method for transmitting data between a transmitting node and a receiving node over a communication network (e.g., 50) according to a non-limiting exemplary embodiment of the present disclosure.

Referring to FIG. 3, at step S310, data of a first type may be transmitted using forward channels from the transmitting node to the receiving node over the network (e.g., 50). At step S320, the receiving node may receive the data of the first type from the transmitting node using the forward channels. At step S330, the receiving node may generate data of a second type based on the received the data of the first type. At step S340, the receiving node may transmit the generated data of the second type using one or more dedicated backward channels to the transmitting node. At step S350, the transmitting node may receive the data of the second type transmitted from the receiving node using the one or more dedicated backward channels.

Figures 4A, 4B:
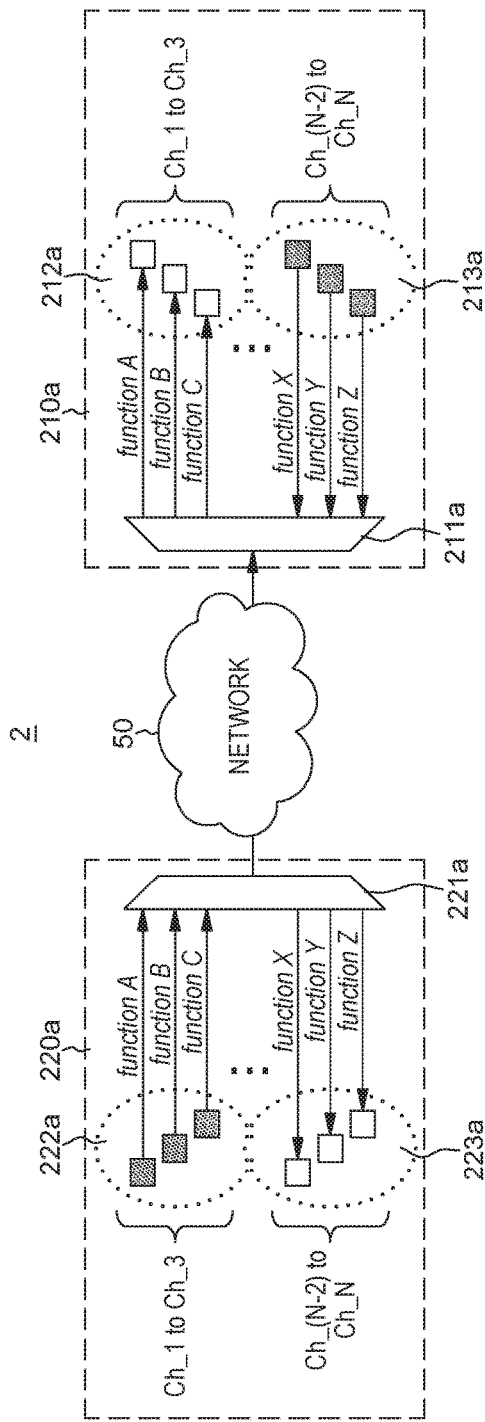
FIG. 4A illustrates a communication network system in which different kinds of traffic functions (or data classes) are assigned to each of multiple channels according to a non-limiting exemplary embodiment of the present disclosure.
FIG. 4B illustrates an example for pairing channels with corresponding functions with reference to FIG. 4A according to a non-limiting exemplary embodiment of the present disclosure.

FIG. 4A illustrates a communication network system 2 in which different kinds of traffic functions (or data classes) are assigned to each of multiple channels used in the network system 2 according to a non-limiting exemplary embodiment of the present disclosure. FIG. 4B illustrates an example for pairing channels with corresponding functions with reference to FIG. 4A according to a non-limiting exemplary embodiment of the present disclosure.

Referring to FIG. 4A, the communication network system 2 may include, but is not limited to, a transmitting node 220a and a receiving node 210a, and a network 50 over which the transmitting node 220a transmits data of the first type to the receiving node 210a. For illustrative purpose, detailed structure of each of the transmitting node 220a and the receiving node 210a are omitted. Thus, each of the transmitting node 220a and the receiving node 210a may further include additional elements other than elements illustrated in FIG. 4A. In addition, in one embodiment, the network system 2 may use a plurality of channels Ch_1 to Ch_N, and some channels (e.g., Ch_1 to Ch_3) among the channels Ch_1 to Ch_N may be assigned as forward channels through which signals serving for traffic functions (or data classes) A to C are transmitted, and other channels (e.g., Ch_(N−2) to Ch_N) among the channels Ch_1 to Ch_N may be assigned as backward channels through which signals serving for traffic functions (or data classes) X to Z are transmitted, as shown in FIG. 4B. Here, N is an integer greater than 1. In the present disclosure, the functions (or the data classes) may be distinguished one from another by a signal or data type to be transmitted through the channels. For example, the signal or data type may include, but is not limited to, data of a first type or data of a second type such as a payload information, a flow control, a control plane, routing tables, analog signaling, or the like.

Channel designs to each of the functions A to Z illustrated in FIG. 4A are only examples, but the present disclosure is not limited thereto. In one embodiment, the number of forward channels may be greater than the backward channels, and thus, the bidirectional bandwidths of the system 2 may be asymmetric.

The transmitting node 220a may include, but is not limited to, a plurality of O/E conversion elements 222a (e.g., photodiode, photodetector, etc.) for converting electrical data signals in the forward channels (e.g., Ch_1 to Ch_3) to corresponding optical signals, a plurality of E/O conversion elements 223a (e.g., directly modulated laser, external modulator, etc.) for converting optical signals in the backward channels (e.g., Ch_(N−2) to Ch_N) to corresponding electrical signals, and an element 221a (e.g., multiplexing-and-demultiplexing unit) for multiplexing the optical data signals of the forward channels (e.g., Ch_1 to Ch_3) and demultiplexing the optical data signals of the backward channels (e.g., Ch_(N−2) to Ch_N).

The receiving node 210a may include, but is not limited to, a plurality of O/E conversion elements 212a for converting optical signals of the forward channels (e.g., Ch_1 to Ch_3) to corresponding electrical data signals, a plurality of E/O conversion elements 213a for converting optical signals in the backward channels (e.g., Ch_(N−2) to Ch_N) to corresponding optical signals, and an element 211a for multiplexing the optical signals of the backward channels (e.g., Ch_(N−2) to Ch_N) and demultiplexing the optical signals of the forward channels (e.g., Ch_1 to Ch_3). In one embodiment, the forward channels (e.g., Ch_1 to Ch_3) and the backward channels (e.g., Ch_(N−2) to Ch_N) may be transmitted over the same optical transmission path of the network 50.

Figure 5A:
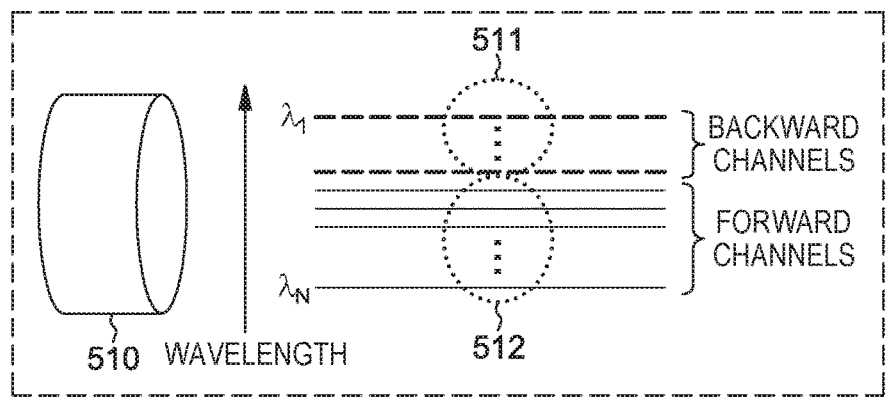
FIGS. 5A to 5C illustrate examples of implementing multiple channels according to a non-limiting exemplary embodiment of the present disclosure.
Figure 5B:
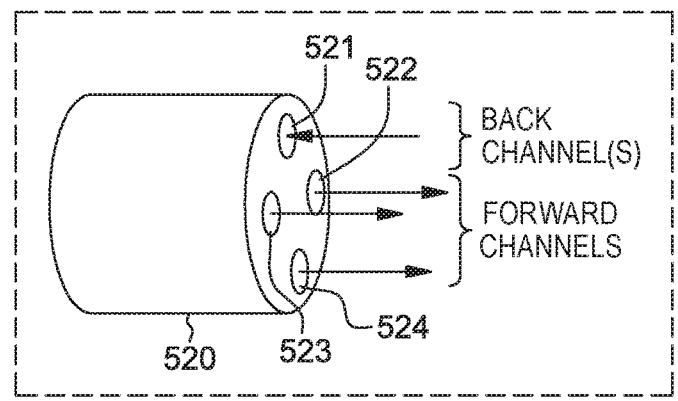
Figure 5C:
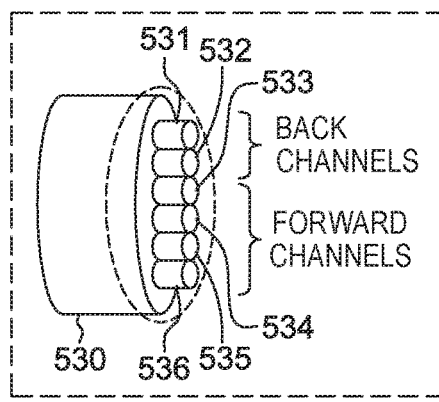

FIGS. 5A to 5C illustrate examples of implementing multi-channels according to a non-limiting exemplary embodiment of the present disclosure. In one embodiment, the channels (or lanes) may be implemented using wavelengths in a WDM link, as shown in FIG. 5A, using physically separated paths (or fibers) in a space-division multiplexed (SDM) link, as shown in FIGS. 5B and 5C, and multiplexed optical modes in a multimode fiber link (or mode division multiplexing link) (not shown). However, these are only examples, but the present disclosure is not limited thereto.

In one embodiment, referring to FIGS. 5A to 5C, optical fibers 510 to 530 may be different in structure. In one embodiment, the optical fiber 510 of FIG. 5A in which the wavelengths are used to implement the multiple channels may be, but are not limited to, a single mode fiber. In this case, the elements 212 (or 212a) and 222 (or 222a) may be embodied with a wavelength division multiplexer (e.g., coarse WDM, dense WDM, or AWG). In one embodiment, when the multiple channels are implemented using the separated physical paths, the optical fibers may be, but are not limited to, a multi-core optical fiber 520 as shown in FIG. 5B or a fiber ribbon 530 as shown in FIG. 5C. Although FIGS. 5A to 5C illustrates optical domain implementation of the multiple channels, it can be applied in an electrical domain along parallel stream of electric wires, PCB traces, differential pairs, or the like. Referring back to FIGS. 5A to 5C, the reference numeral 511 represents backward channels, and the reference numeral 512 represents forward channels. The reference numeral 521 represents a backward channel, and the reference numerals 522 to 524 represent forward channels. The reference numerals 531 and 532 represent backward channels, and the reference numerals 533 to 536 represent forward channels.

Figure 6:
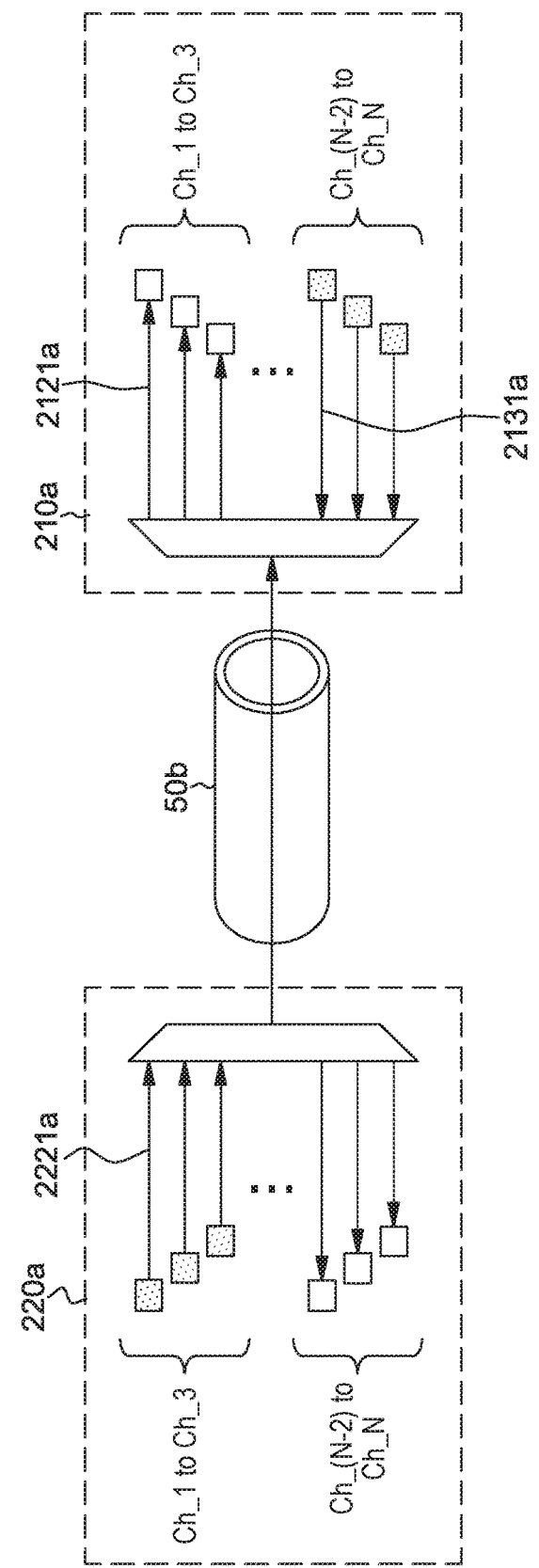
FIG. 6 is an optical communication network system showing an example of using a dedicated backward channel(s) to determine an optical link loss according to a non-limiting exemplary embodiment of the present disclosure.

In an aspect of using one or more dedicated backward channels, an optical power loss (e.g., attenuation) of an optical link can be measured, as shown in FIG. 6.

FIG. 6 is an optical communication network system 3 showing an example of using a dedicated backward channel(s) to determine an optical link loss according to a non-limiting exemplary embodiment of the present disclosure. The network system 3 of FIG. 6 may have substantially the same configuration as the network system 2 of FIG. 4A except an optical link 50b. Duplicate description thereof will be omitted for the sake of simplicity. Also, in FIG. 6, elements to which reference numerals are not given may have the same reference numerals as corresponding elements in FIG. 4A.

Typically, since a power loss over an optical link (e.g., 50b) is unknown, a dynamic range needed by a receiver circuitry may have to be large.

In one embodiment, referring to FIG. 6, the transmitting node 220a may transmit a data signal(s) 2221a to the receiving node 210a using a channel (e.g., Ch_1) over the optical fiber link 50b. At this time, the transmitting node 220a may have known the intensity of the data signal(s) 2221a, and the receiving node 210a may detect intensity of the received data signal 2121a and send back a response signal 2131a with information of the detected intensity of the data signal 2121a using a dedicated backward channel (e.g., Ch_(N−2)). Thus, the transmitting node 220a may determine a power loss of the optical link 50b by calculating a difference between the known intensity (when the signal 2221a is transmitted) and the detected intensity of the data signal 2121a. Based on the determined optical link loss, the transmitting node 220a may be configured to adjust its transmitting optical power to ensure the other side's (e.g., the receiving node 210a) received optical power to be within a relatively narrow power range.

Figure 7A:
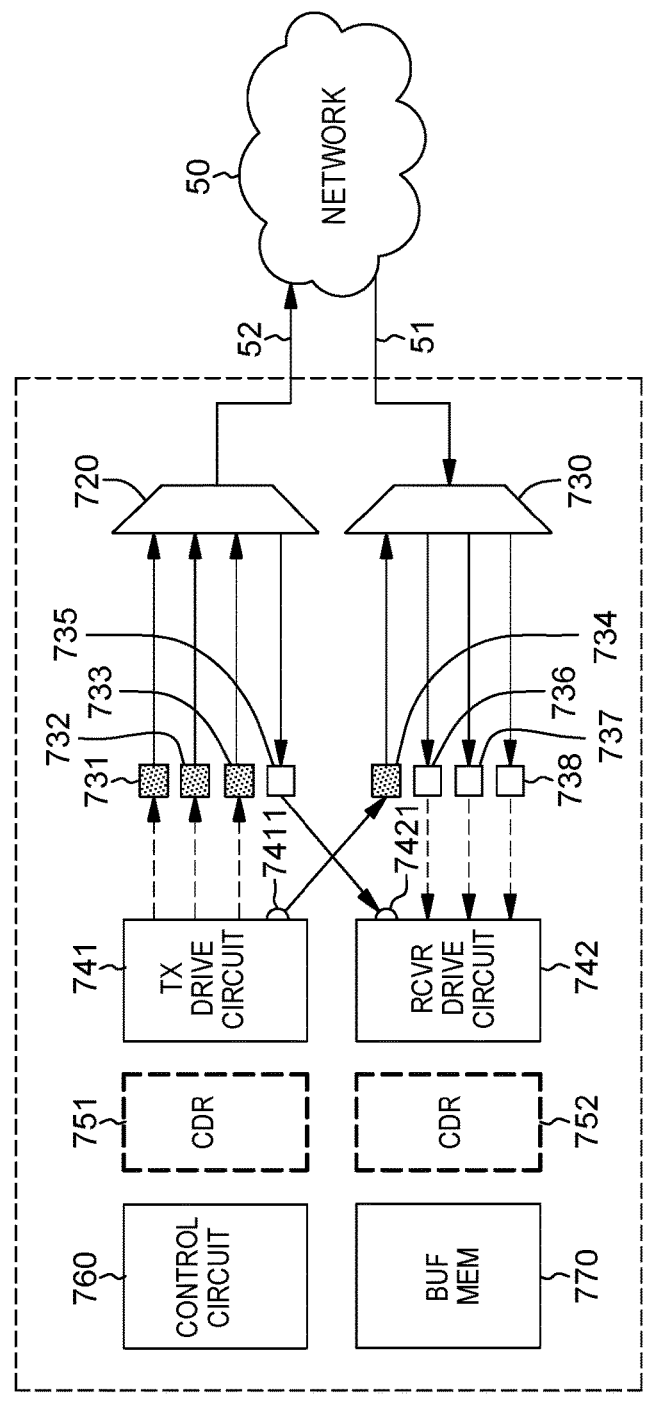
FIGS. 7A illustrates an example of an optical transceiver according to a non-limiting exemplary embodiment of the present disclosure.
Figure 7B:
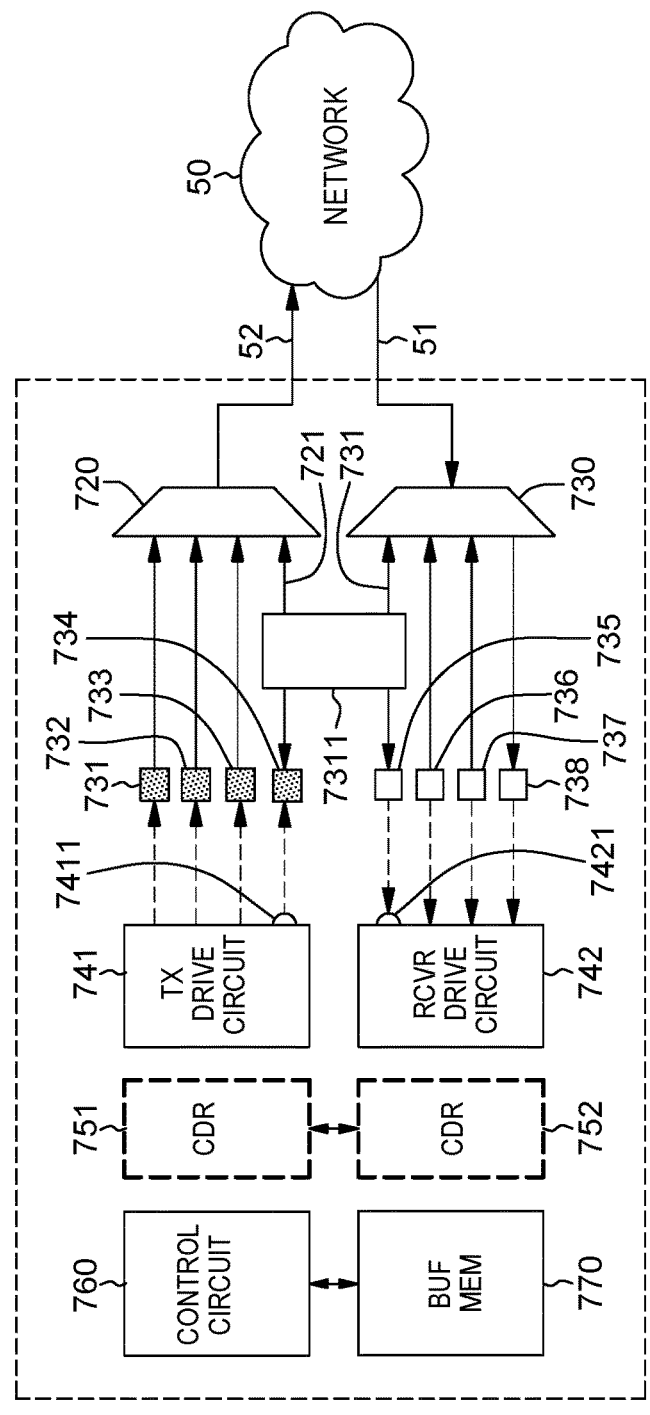
FIG. 7B illustrates an example of an optical transceiver according to a non-limiting exemplary embodiment of the present disclosure.

FIGS. 7A illustrates an example of an optical transceiver 700a according to a non-limiting exemplary embodiment of the present disclosure. FIG. 7B illustrates an example of an optical transceiver 700b according to a non-limiting exemplary embodiment of the present disclosure.

In one embodiment, each of the optical transceivers 700a and 700b of FIGS. 7A and 7B may be a pluggable optical transceiver and may include, but is not limited to, a buffer memory 770 which provides enough buffering capacity to cove a round-trip distance across an optical link (e.g., 50) between transceiver pairs, at the bandwidth that the modules support.

Referring to FIG. 7A, the optical transceiver 700a may further include a plurality of E/O conversion elements 731 to 734, a plurality of O/E conversion elements 735 to 738, a first multiplexing-and-demultiplexing unit 720, a second multiplexing-and-demultiplexing unit 730, a transmitter driving circuitry 741, and a receiver driving circuitry 742. The E/O conversion elements 731 to 733 may convert electrical signals including, e.g., data of the first type, provided from the transmitter driving circuitry 741 to corresponding optical signals. The E/O conversion element 734 may convert electrical signals including, e.g., data of the second type, provided from the transmitter driving circuitry 741 to corresponding optical signals. In addition, the O/E conversion elements 736 to 738 may convert optical signals including, e.g., data of the first type, transmitted from other transmitting node (not shown) over the network 50 to corresponding electrical signals, and the O/E conversion element 735 may convert optical signals including, e.g., data of the second type, transmitted from a (or the) transmitting node (not shown) over the network 50 to corresponding electrical signals.

The element 720 may multiplex the optical signals output from the E/O conversion elements 731 to 733 to transmit the multiplexed optical signals using forward channels over the optical link 52 of the network 50 and demultiplex the optical signals transmitted using backward channels of the optical link 51 of the network 50 to provide the demultiplexed optical signals to the receiver driving circuitry 742. The element 730 may multiplex the optical signals output from the E/O conversion elements 734 to transmit the multiplexed signals using backward channels of the optical link 51 and demultiplex the optical data signals transmitted using forward channels of the optical link 51 to provide the demultiplexed optical signals to the receiver driving circuitry 742. In one embodiment, referring to FIG. 7A, the optical transceiver 700a may further include a control circuitry 760 which may be coupled with a buffer memory 770. In one embodiment, the control circuitry 760 may perform, but is not limited to, flow control, error recovery, forward error correction (FEC) on the data buffered on the buffer memory 770 or perform assigning a traffic function(s) (or a data class(s)) (e.g., flow control, analog signal transfer, etc.) to each of multiple channels. In one embodiment, clock-and-data recovery (CDR) circuitries 751 and 752 may be disposed at each output of the transmitting driving circuitry 741 and the receiver driving circuitry 742. Although not shown in FIG. 7A, a microcontroller and memory such as erasable programmable read-only memory (EPROM), etc. may be included in the optical transceiver 700a of FIG. 7A.

In one embodiment, at least one output port 7411 of the transmitter driving circuitry 741 may be configured to drive the E/O conversion element 734 which corresponds to a dedicated backward channel. In one embodiment, at least one input port 7421 of the receiver driving circuitry 742 may be configured to drive the O/E conversion element 735 or receive the output thereof.

The optical transceiver 700b of FIG. 7B may have substantially the same configuration as the transceiver 700a of FIG. 7A except that an optical switch 7311 is connected between the transmitter driving circuitry 741 and the element 720, and between the receiver driving circuitry 742 and the element 730.

In one embodiment, the optical transceiver 700B may operate in a switched manner between a standard mode and a bidirectional mode. For example, in the standard mode (e.g., when no data of the second type is transmitted), the optical switch 7311 may connect an output port of the E/O conversion element 734 to an input port 721 of the element 720 and connect an output port 731 of the element 730 to an input port of the O/E conversion element 735, and thus, channel usage efficiency in transmitting data messages can be maximized.

In one embodiment, in the bidirectional mode, the optical switch 7311 may be configured to change the connections between elements (e.g., 734, 735, 720, and 730) connected thereto, so that the output port (e.g., the input port in the standard mode) of the E/O conversion element 734 may be switched to be connected to the input port 731 (e.g., the output port 731 in the standard mode) of the element 730 and the output port 721 (e.g., the input port 721 in the standard mode) of the element 720 may be switched to be connected to the output port (e.g., the input port in the standard mode) of the O/E conversion element 735. In one embodiment, the optical transceiver 700b operating in the bidirectional mode may have substantially the same configuration as the optical transceiver 700a.

Thus, in one embodiment, each of the optical transceivers 700a and 700b may perform, e.g., flow control, error recovery, forward error correction (FEC), or the like, to manage all the work of successfully guaranteed data transport between themselves. Therefore, switches, adaptors, and/or processors, etc. in an optical network system might not need to manage flow control across the whole link; instead, they may only have to manage the data flow to and from their locally-attached transceivers, and they might not need any significant buffering space, or any of that link-management logic and could go back to simple task of just managing the on-printed circuit board (PCB) communications out to the transceiver modules. As memory such as dynamic random access memory (DRAM)/static RAM (SRAM) gets denser and operates with lower-power, the above-described features may more likely be feasible. In one embodiment, the optical transceiver (e.g., 700a or 700b) may be designed to handle whatever complexity there may be in talking through an optical circuit switch (OCS), allowing to hide the functions such as flow controls, error recovery, FEC, or the like away from the switches or processors.

Figure 8:
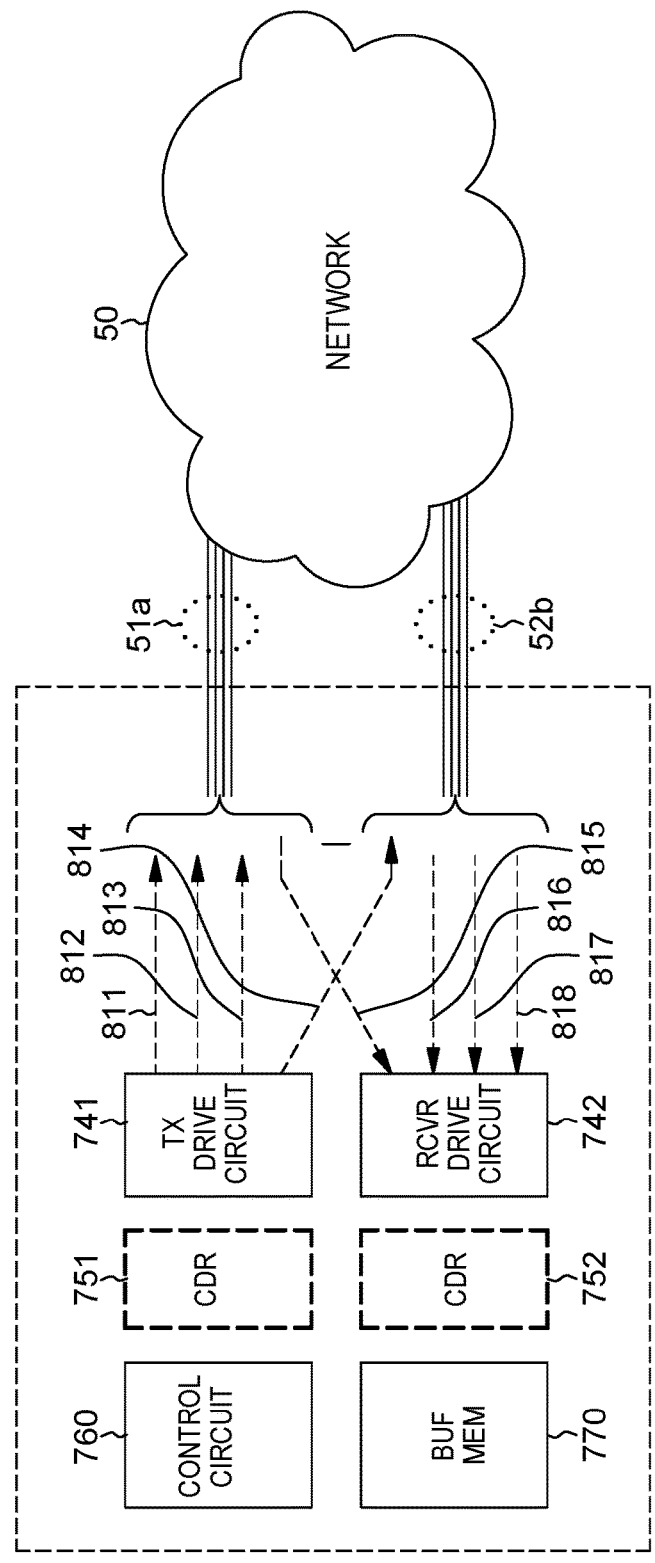
FIG. 8 illustrates an example of an electronic transceiver according to a non-limiting exemplary embodiment of the present disclosure.

FIG. 8 illustrates an example of an electronic transceiver 800a according to a non-limiting exemplary embodiment of the present disclosure.

Referring to FIG. 8, the transceiver 800a may have substantially the same configuration as the optical transceiver 700a of FIG. 7A except that some optical elements (e.g., 720, 730 and 731 to 738) of FIG. 7A are removed and replaced by electrical paths 811 to 818. Thus, duplicate descriptions will be omitted for the sake of simplicity. In one embodiment, signals of the electrical paths 811 to 813 may be transmitted using forward channels of an electrical link 51a of the network 50, and signals transmitted using backward channels of the electrical link 51a may be received through the electrical path 815 to be provided to the receiver driving circuitry 742. In one embodiment, signals of the electrical path 814 may be transmitted using backward channels of an electrical link 52a of the network 50, and signals transmitted using forward channels of the electrical link 52a may be received through the electrical paths 816 to 818 to be provided to the receiver driving circuitry 742. In one embodiment, each of the electrical paths 810 and 820 may include, but are not limited to, one or more electrical cables, PCB traces, and a parallel array of electrical wires.

Figure 9B:
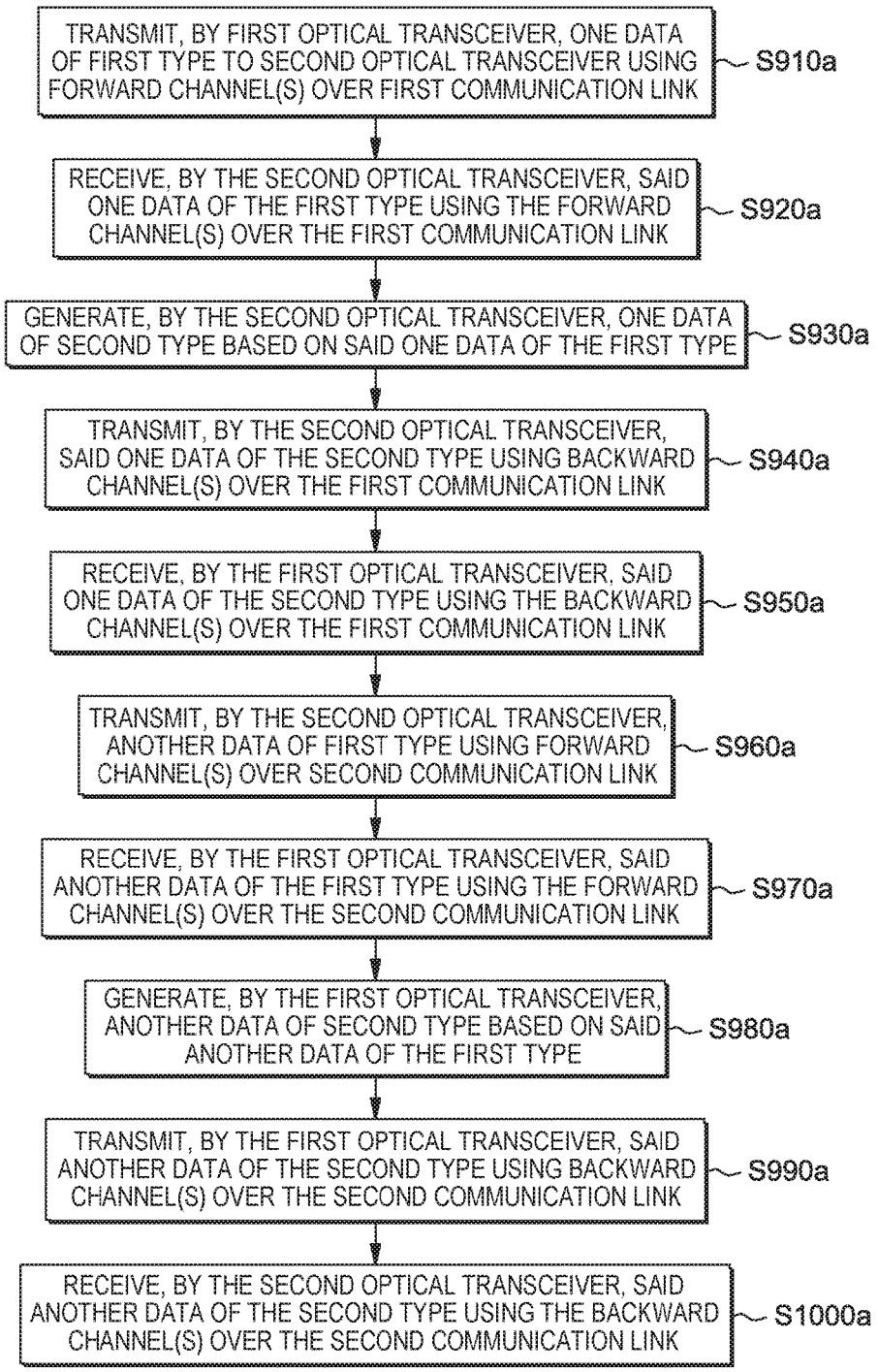
FIG. 9B is a flow chart illustrating a method for performing a bidirectional communication between the optical transceivers according to a non-limiting exemplary embodiment of the present disclosure
Figure 9C:
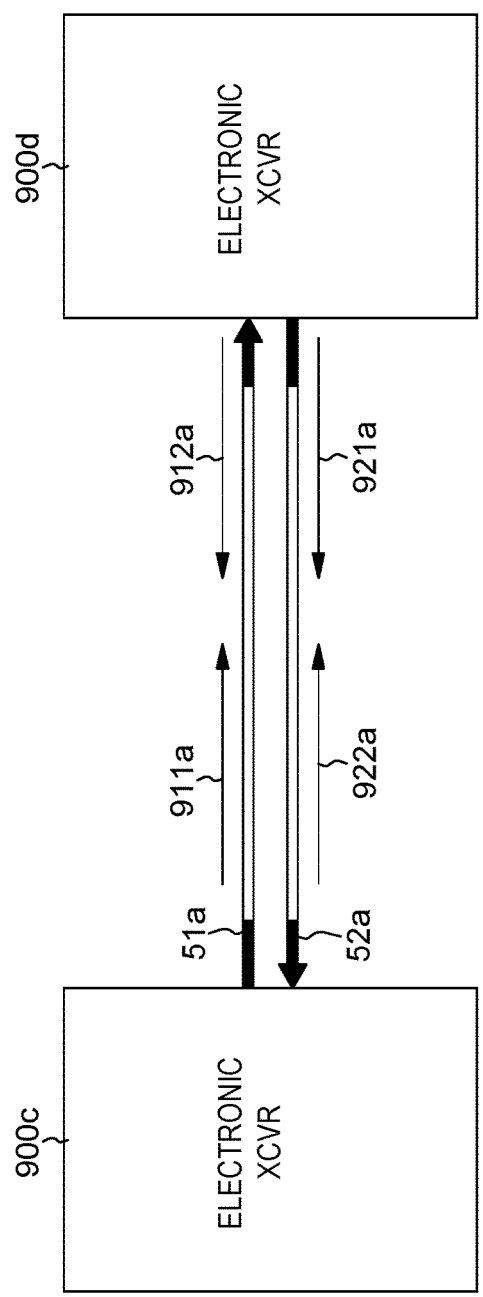
FIG. 9C is a diagram illustrating a bidirectional communication between electronic transceivers according to a non-limiting exemplary embodiment of the present disclosure.
Figure 9D:
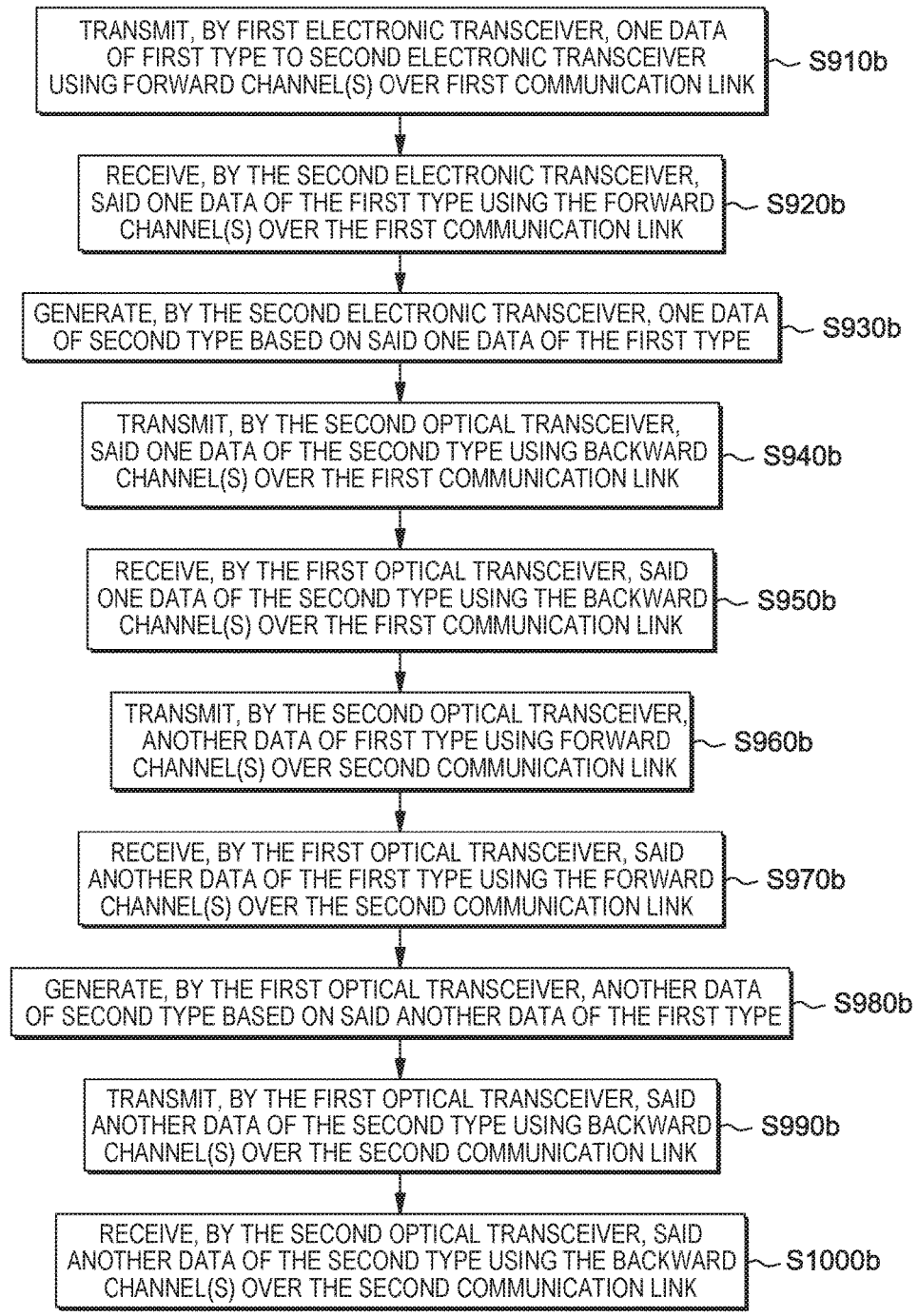
FIG. 9D is a flow chart illustrating a method for performing a bidirectional communication between the electronic transceivers according to a non-limiting exemplary embodiment of the present disclosure.

FIG. 9A is a diagram illustrating a bidirectional communication between optical transceivers 900a and 900b according to a non-limiting exemplary embodiment of the present disclosure. FIG. 9B is a flow chart illustrating a method for performing a bidirectional communication between the optical transceivers 900a and 900b according to a non-limiting exemplary embodiment of the present disclosure. FIG. 9C is a diagram illustrating a bidirectional communication between electronic transceivers 900c and 900d according to a non-limiting exemplary embodiment of the present disclosure. FIG. 9D is a flow chart illustrating a method for performing a bidirectional communication between the electronic transceivers 900c and 900d according to a non-limiting exemplary embodiment of the present disclosure.

Referring to FIGS. 9A and 9B, the bidirectional communication may be conducted using the first communication link 51 and the second communication link 52. Each of the optical transceivers 900a and 900b may be substantially the same as either the optical transceiver 700a of FIG. 7A or the optical transceiver 700b of FIG. 7B. At step S910a, the optical transceiver 900a may transmit one data of a first type 911 to the optical transceiver 900b using one or more forward channels over the first communication link 51. At step S920a, the optical transceiver 900b may receive said one data of the first type 911 using the one or more forward channels over the first communication link 51. At step 930a, the optical transceiver 900b may generate one data of a second type 912 based on said one data of the first type 911 received using the one or more forward channels over the first communication link 51. At step S940a, the optical transceiver 900b may transmit said one data of the second type 912 to the optical transceiver 900a using one or more backward channels over the first communication link 51. At step S950a, the optical transceiver 900a may receive said one data of the second type 912 using the one or more backward channels over the first communication link 51. At step S960a, the optical transceiver 900b may transmit another data of a first type 921 to the optical transceiver 900a using one or more forward channels over the second communication link 52. At step S970a, the optical transceivers 900a may receive said another data of the first type 921 using the one or more forward channels over the second communication link 51. At step S980a, the optical transceiver 900a may generate another data of a second type 922 based on said another data of the first type 921 received using the one or more forward channels over the second communication link 52. At step S990a, the optical transceiver 900a may transmit said another data of the second type 922 to the optical transceiver 900b using one or more backward channels over the second communication link 52. At step S1000a, the optical transceiver 900b may receive said another data of the second type 922 using the one or more backward channels over the second communication link 52.

Referring to FIGS. 9C and 9D, the bidirectional communication may be conducted using the first communication link 51a and the second communication link 52a. Each of the electronic transceivers 900c and 900d may be substantially the same as the transceiver 800a of FIG. 8. At step S910b, the electronic transceiver 900c may transmit one data of a first type 911a to the electronic transceiver 900d using one or more forward channels over the first communication link 51a. At step S920b, the electronic transceiver 900d may receive said one data of the first type 911a using the one or more forward channels over the first communication link 51a. At step 930b, the electronic transceiver 900d may generate one data of a second type 912a based on said one data of the first type 911a received using the one or more forward channels over the first communication link 51a. At step S940b, the electronic transceiver 900d may transmit said one data of the second type 912a to the electronic transceiver 900c using one or more backward channels over the first communication link 51a. At step S950b, the electronic transceiver 900c may receive said one data of the second type 912a using the one or more backward channels over the first communication link 51a. At step S960b, the electronic transceiver 900d may transmit another data of a first type 921a to the electronic transceiver 900c using one or more forward channels over the second communication link 52a. At step S970b, the electronic transceiver 900c may receive said another data of the first type 921a using the one or more forward channels over the second communication link 51a. At step S980b, the electronic transceiver 900c may generate another data of a second type 922a based on said another data of the first type 921a received using the one or more forward channels over the second communication link 52a. At step S990b, the electronic transceiver 900c may transmit said another data of the second type 922a to the electronic transceiver 900d using one or more backward channels over the second communication link 52a. At step S1000b, the electronic transceiver 900d may receive said another data of the second type 922a using the one or more backward channels over the second communication link 52a.

Figure 10:
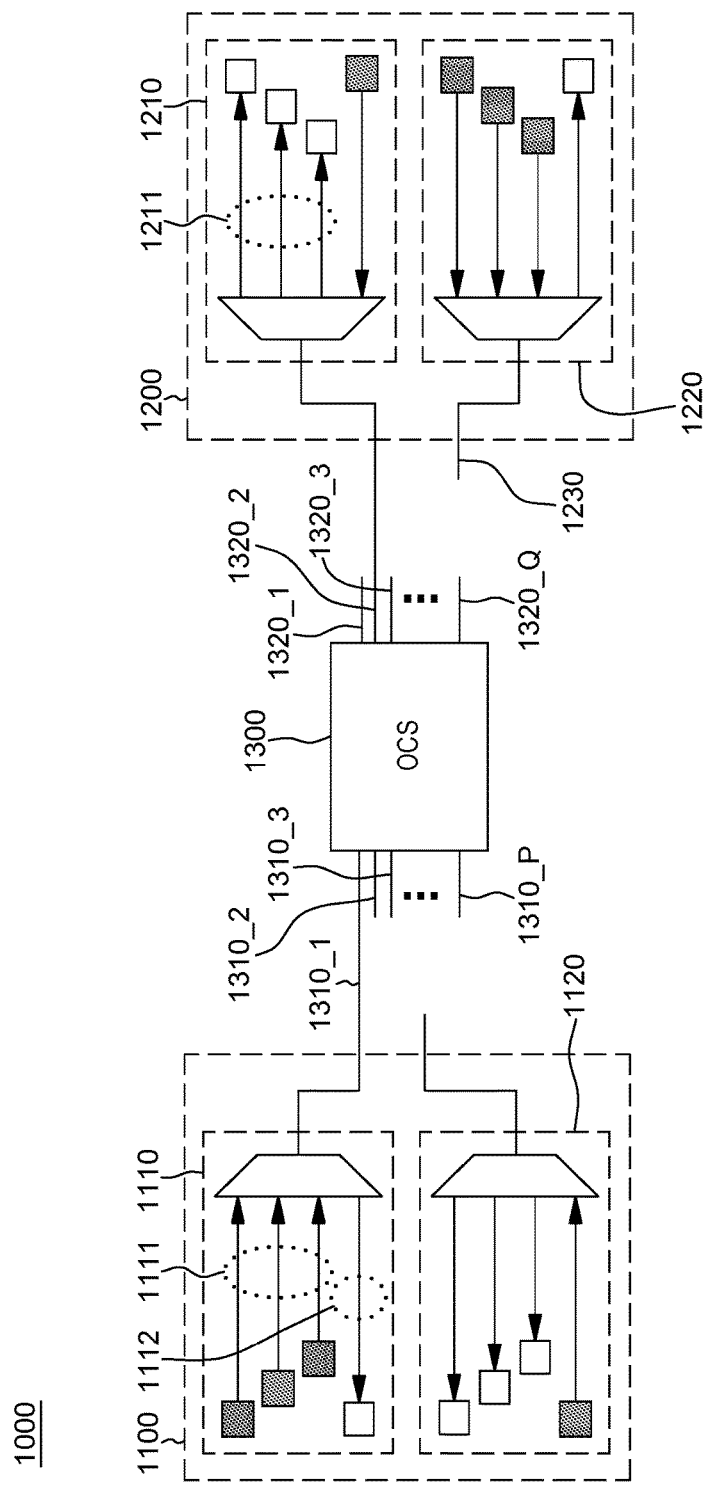
FIG. 10 illustrates an example of a bidirectional optical communication network for showing how optical transceivers communicate through an optical circuit switch (OCS) according to a non-limiting exemplary embodiment of the present disclosure.

FIG. 10 illustrates an example of a bidirectional optical communication network 1000 for showing how optical transceivers communicate through an optical circuit switch (OCS) 1300 according to a non-limiting exemplary embodiment of the present disclosure.

Referring to FIG. 10, the optical communication network 1000 may include, but is not limited to, optical transceivers 1100 and 1200 and a bidirectional OCS 1300 disposed between the optical transceivers 1100 and 1200. The optical transceivers 1100 and 1200 may be transceivers at first and second communication nodes, respectively, in the network 1000. The OCS 1300 may include a plurality of input ports 1310_1 to 1310_P and a plurality of output ports 1320_1 to 1320_Q and perform all-optical switching on connections between the input ports 1310_1 to 1310_P and the output ports 1320_1 to 1320_Q. Here, P and Q are integers greater than 1. In one embodiment, each of the optical transceivers 1100 and 1200 may be substantially the same as either the optical transceiver 700a of FIG. 7A or the optical transceiver 700b of FIG. 7B, although some detailed descriptions are not shown. In one embodiment, if a circuit connection is established between the optical transceivers 1100 and 1200, all co-propagating (e.g., forward) and counter-propagating (e.g., backward) signals may be exchanged through the established circuit connection. For example, a circuit connection may be maintained until all co-propagating and counter-propagating signals have egressed. Thus, in one embodiment, the bidirectional communication between a transmitter module 1110 of the optical transceiver 1100 (at the first node) and a receiver module 1210 of the optical transceiver 1200 (at the second node) may be conducted through the established single circuit connection, consuming a single input port (e.g., 1310_1) and a single output port (e.g., 1320_2). For example, co-propagating signals with data of the first type may be transmitted along with channel paths 1111 of the transmitter module 1110, the port (e.g., 1310_1) of the OCS 1300, the port (e.g., 1320_2) of the OCS 1300, and channel paths 1211 of the receiver module 1210, and counter-propagating signals with data of the second type may be transmitted through the same path as the counter-propagating signals, but a reverse order (e.g., the channel paths 1211 of the receiver module 1210, the port (e.g., 1310_2) of the OCS 1300, the port (e.g., 1320_1) of the OCS 1300, and the channel paths 1111 of the transmitter module 1110. Thus, this bidirectional signal traffic feature, where the co-propagating signals with data of the first type and the counter-propagating signals with data of the second type are transmitted over a common optical path including the OCS 1300, may allow the OCS 1300 to save a port. The saved port can be used to switch a transmitter module 1220 of the optical transceiver 1200 of the second node to other communication node (not shown).

FIG. 11 illustrates an example of a bidirectional communication network 2000 for showing how optical transceivers 2010 to 2080 communicate through an electronic circuit switch (ECS) 2300 according to a non-limiting exemplary embodiment of the present disclosure.

As shown in FIG. 11, the bidirectional communication network 2000 may include, but is not limited to, a plurality of optical transceivers 2010 to 2080 and an ECS 2300 disposed between each of the group of optical transceivers 2050 and 2060 and each of the group of optical transceivers 2070 and 2080. In addition, the optical transceivers 2010 to 2040 may communicate with the optical transceivers 2050 to 2080, respectively, through respective optical paths 2110 to 2140.

In addition, each of the optical transceivers 2010, 2020, 2050, and 2060 may communicate directly or indirectly with at least one of the optical transceivers 2030, 2040, 2070, and 2080 through the ECS 2300.

Similar to the case using the OCS 1300 of FIG. 10, once a circuit connection is established between the optical transceivers through the ECS 2300, the connection may be maintained until all co-propagating and counter-propagating signals between the optical transceivers have egressed.

In one embodiment, the ECS 2300 of FIG. 11 may have similar functions to the OCS 1300 of FIG. 10, but different in that the ECS 2300 includes entirely electrical input/outputs, indicated as dashed arrows in FIG. 11. Although not described in detail with reference to FIG. 11, each of the optical transceivers 2010 to 2080 may have a similar configuration to the optical transceiver 700a of FIG. 7A or the optical transceiver 700b of FIG. 7B. Thus, duplicate descriptions thereof will be omitted for the sake of simplicity.

Figure 12A:
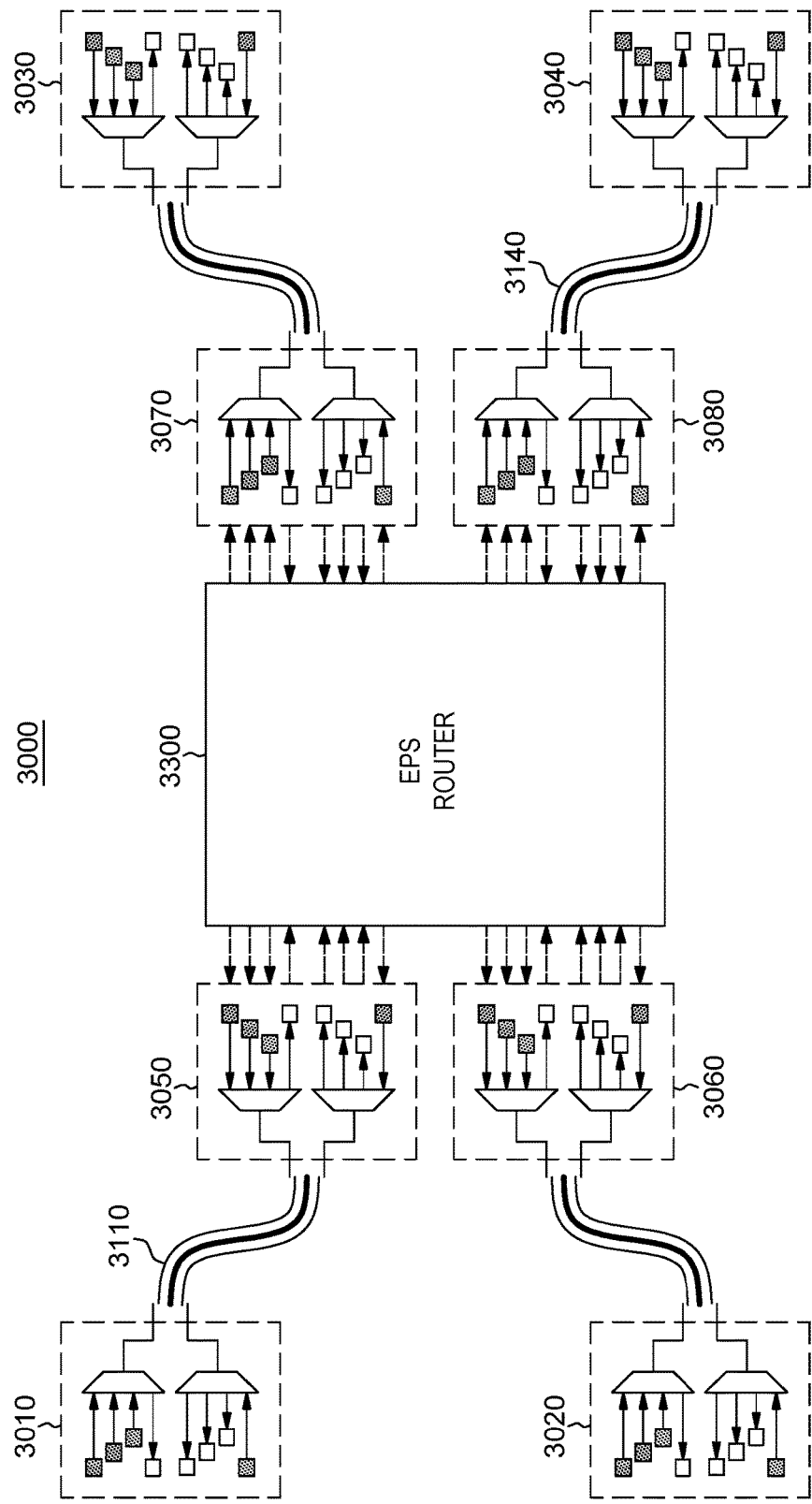
FIG. 12A illustrates an example of a bidirectional communication network for showing how optical transceivers communicate through an electronic packet switch (EPS) router according to a non-limiting exemplary embodiment of the present disclosure.

FIG. 12A illustrates an example of a bidirectional communication network 3000 for showing how optical transceivers 3010 to 3080 communicate through an electronic packet switch router 3300 according to a non-limiting exemplary embodiment of the present disclosure.

Figure 12B:
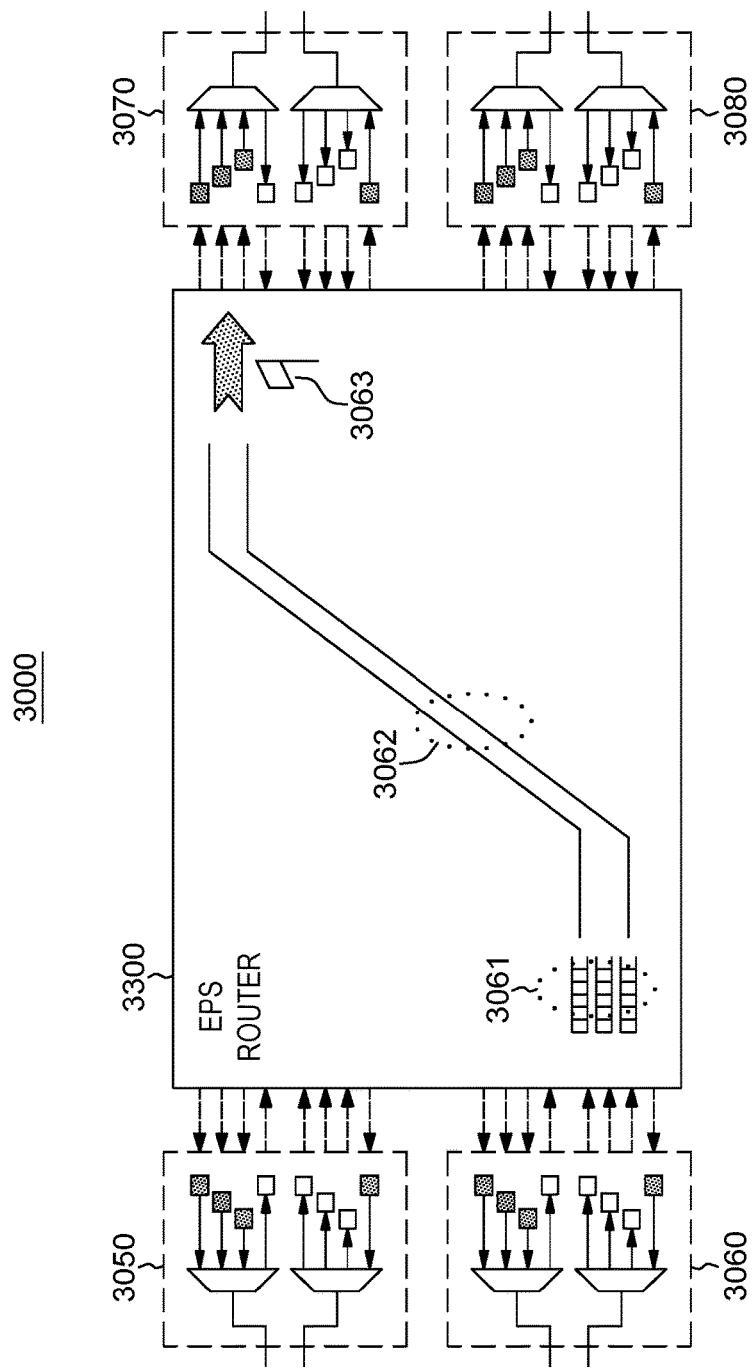
FIG. 12B illustrates an example of how the EPS router operates to establish data transfer paths between optical transceivers in a communication network and how the optical transceivers transmit data packets according to a non-limiting exemplary embodiment of the present disclosure.
Figure 12C:
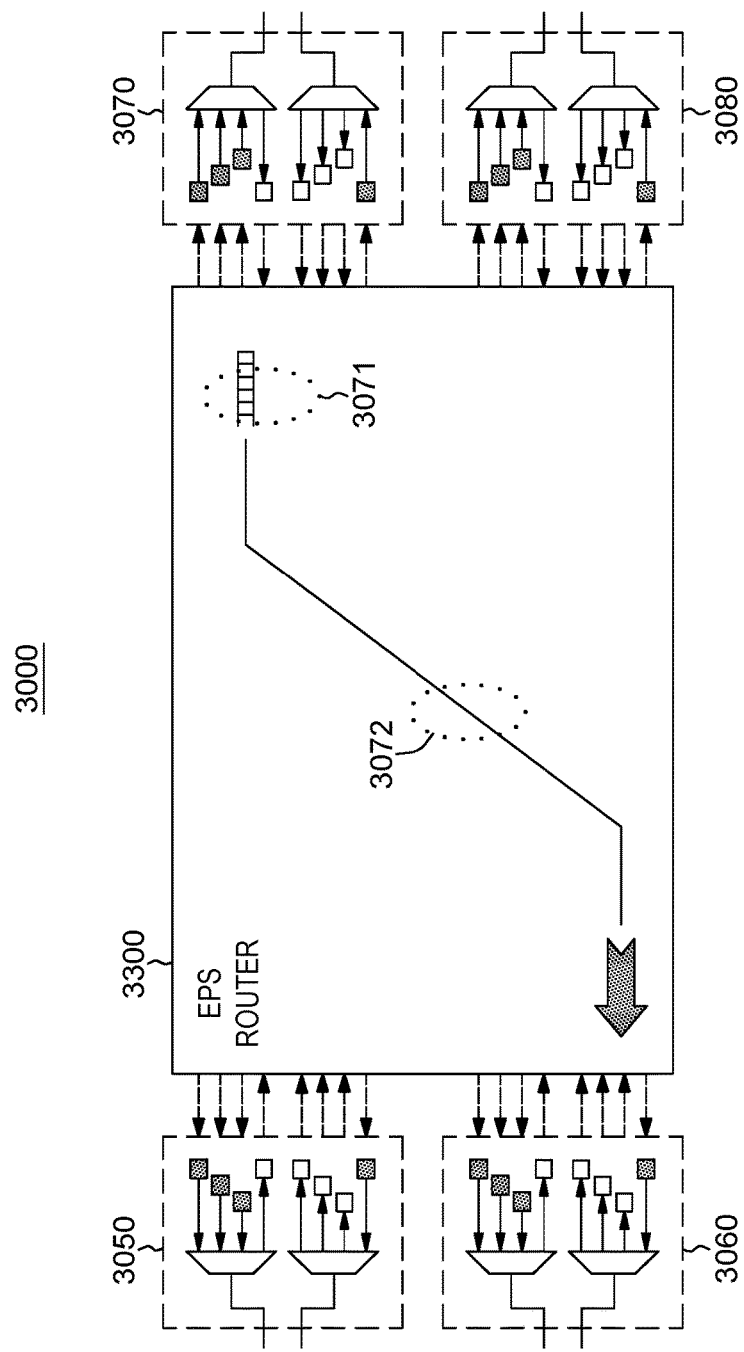
FIG. 12C illustrates an example of how optical transceivers transmits control packets along the same network path as the data packets are transmitted according to a non-limiting exemplary embodiment of the present disclosure.

The communication network 3000 of FIG. 12A may have substantially the same configuration as the network 2000 of FIG. 11 except the electronic packet switch (EPS) 3000. Like the network 2000 using the ECS 2300 of FIG. 11, the EPS router 3300 may have planes (or elements) (not shown) for performing O/E/O and E/O/E conversion, but router state (e.g., network path) might not be maintained. Referring to FIG. 11, a data path (or network path) from a source transceiver (e.g., 3010) to a destination transceiver (e.g., 3040) may go over two point-to-point (P2P) links (e.g., 3110 and 3140) and the EPS router 3300 which corresponds to one hop. If the number of EPS routers is two, the data path may become two hops. Although not described in detail with reference to FIG. 12A, each of the optical transceivers 3010 to 3080 may have a similar configuration to the optical transceiver 700a of FIG. 7A or the optical transceiver 700b of FIG. 7B. Thus, duplicate descriptions thereof will be omitted for the sake of simplicity. FIG. 12B illustrates an example of how the EPS router 3300 operates to establish network paths between optical transceivers in the communication network 3000 and how the optical transceivers transmits data messages (or packets) including, e.g., data of a first type, through the EPS router 3300 according to a non-limiting exemplary embodiment of the present disclosure. FIG. 12C illustrates an example of how the optical transceivers transmits control messages (or packets) including, e.g., data of a second type, along the same network path as the data messages are transmitted according to a non-limiting exemplary embodiment of the present disclosure.

Referring to FIGS. 12B and 12C, it is assumed that packets exchanges are made between the optical transceivers 3060 and 3070 for illustrative purpose. However, exemplary embodiments of the present disclosure are not limited thereto. In one embodiment, the network 3000 using the EPS router 3300 may realize a backward channel (e.g., backchannel) with a lower latency based on a bread crumb approach. For example, when one or more forward-going data packets 3061 (e.g., data of a first type transmitted using forward channels) is transmitted by the optical transceiver 3060 and progresses through network paths 3062 routed in the EPS router 3300, the EPS router 3300 may set a flag 3063 (e.g., leave a bread crumb) to indicate that a backward-going control packet 3071 (e.g., data of a second type transmitted using backward channels) will be returning along the same network path 3072.

Figure 12D:
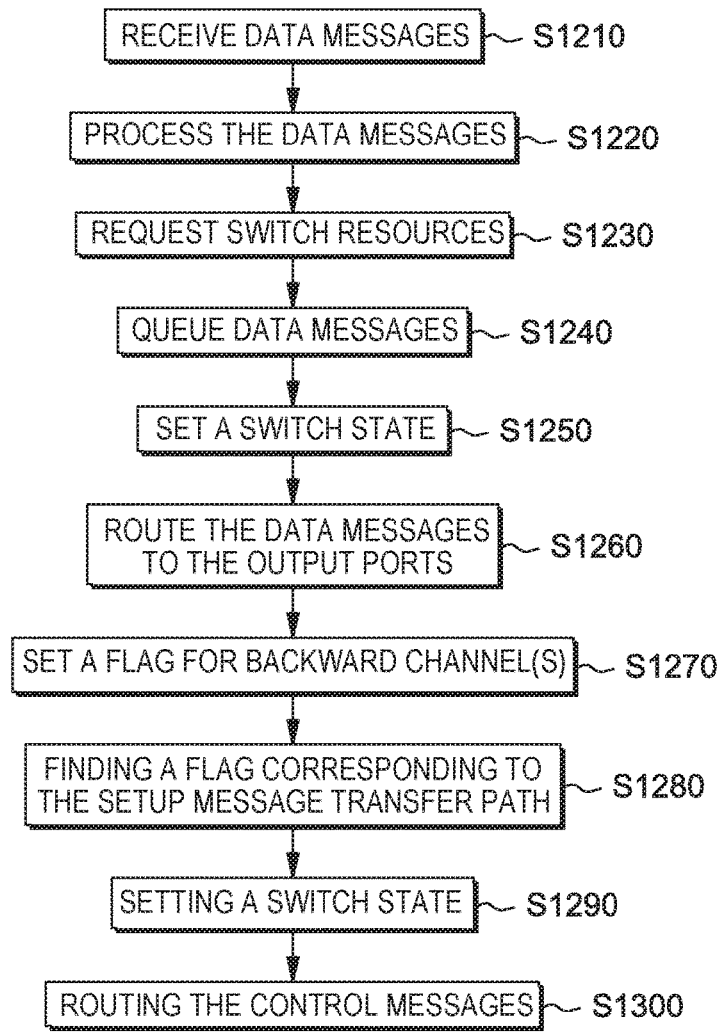
FIG. 12D is a flowchart illustrating a method for routing packets through an EPS router according to a non-limiting exemplary embodiment of the present disclosure.

FIG. 12D is a flowchart illustrating a method for routing packets through an EPS router 3300 according to a non-limiting exemplary embodiment of the present disclosure.

Referring to FIG. 12A to 12D, at step S1210, the optical transceiver 3060 may receive the forward-going data packets 3061, and at step S1220, the optical transceiver 3060 may process the forward-going data packets 3061. The processing of the data packet(s) 3061 may further include buffering the data packets 3061, extracting address information from the data packets 3061, and/or assigning an output port to be routed (not shown in FIG. 12D). At step S1230, the optical transceiver 3060 may request switch resources. At step S1240, the optical transceiver 3060 may queue the data packets 3061 until the request for the switch resources are granted. The EPS router 3300 may set a switch state (S1250) and route the data packets 3061 through the network paths 3062 to output ports thereof (S1260). Further, at step S1270, the EPS router 3300 may set a flag 3063 for backward channel(s) used for transmission of control packets 3071. When the control packets 3071 generated based on the data packets 3061 is transmitted, the optical transceiver 3070 (or the EPS router 3300) may find the flag 3063 corresponding to the network path 3062 over which the data packets 3061 are routed (S1280), and set a switch state according to the flag 3063 (S1290), and route the control packets 3071 to the optical transceiver 3060 (S1300) along the network path 3072 which is the same as one of the paths 3062 which have been routing paths for the data packet 3061.

Figure 13:
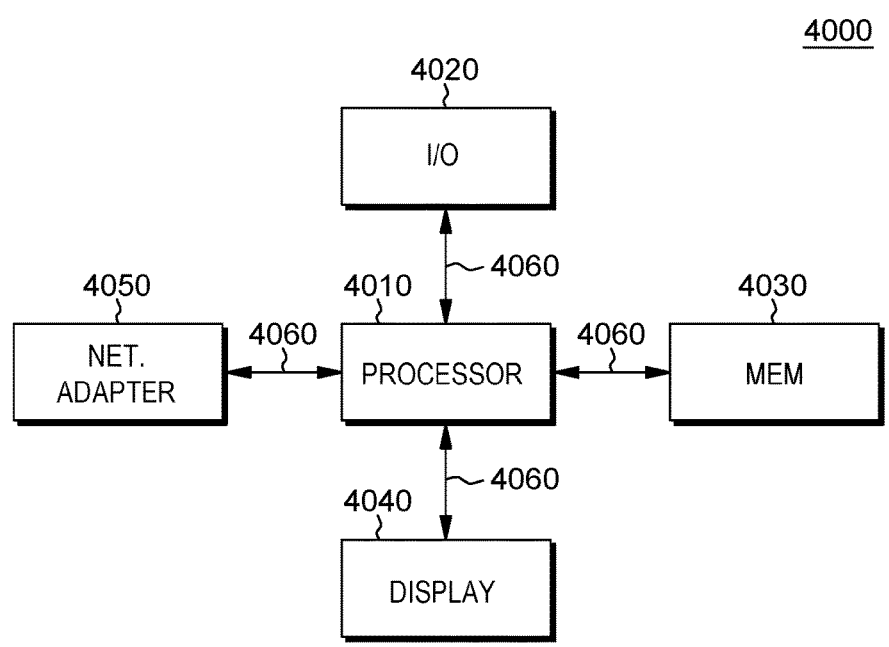
FIG. 13 is a block diagram of a computing system according to a non-limiting exemplary embodiment of the present disclosure.

FIG. 13 is a block diagram of a computing system 4000 according to a non-limiting exemplary embodiment of the present disclosure.

Referring to FIG. 13, the computing system 4000 may be used as a platform for performing the functions or operations described hereinabove with respect to the transceiver 20 of FIG. 2, the transceiver 700a of FIG. 7A, the transceiver 700b of FIG. 7B, the transceiver 800a of FIG. 8, the network 1000 of FIG. 10, the network 2000 of FIG. 11, the network 3000 of FIG. 12A and/or the methods of FIGS. 3, 9B, and 9D.

In addition, the computing system 4000 may be implemented with a ultra-mobile personal computer (UMPC), a net-book, a personal digital assistance (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

Referring to FIG. 13, the computing system 4000 may include a processor 4010, I/O devices 4020, a memory system 4030, a display device 4040, and a network adaptor 4050.

The processor 4010 may drive the I/O devices 4020, the memory system 4030, the display device 4040, and the network adaptor 4050 through a bus 4060.

The computing system 4000 may include a program module for performing the functions or operations described hereinabove with respect to the transceiver 20 of FIG. 2, the transceiver 700a of FIG. 7A, the transceiver 700b of FIG. 7B, the transceiver 800a of FIG. 8, the network 1000 of FIG. 10, the network 2000 of FIG. 11, the network 3000 of FIG. 12A and/or the methods of FIGS. 3, 9B, and 9D according to exemplary embodiments. For example, the program module may include routines, programs, objects, components, logic, data structures, or the like, for performing particular tasks or implement particular abstract data types. The processor (e.g., 4010) of the computing system 4000 may execute instructions written in the program module to perform the functions or operations described with respect to the transceiver 20 of FIG. 2, the transceiver 700a of FIG. 7A, the transceiver 700b of FIG. 7B, the transceiver 800a of FIG. 8, the network 1000 of FIG. 10, the network 2000 of FIG. 11, the network 3000 of FIG. 12A and/or the methods of FIGS. 3, 9B, and 9D. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) can communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, or the like.

Exemplary embodiments of the present disclosure may include a system, a method, and/or a computer program product at any possible technical detail level of integration. The computer program product may include a non-transitory computer readable storage medium (e.g., the memory system 4030) having computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device, and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A method for exchanging data between a first device and a second device over two or more communication links including first and second communication links, comprising:
    transmitting, by the first device, optical signals having one data of a first type using one or more first channels in a forward direction over the first communication link;
    receiving and demultiplexing, by the second device, said optical signals having said one data of the first type using the one or more first channels over the first communication link and converting said received optical signals having said first type data into electrical signals using optical-to-electrical conversion elements, the second device having a receiver drive circuit for receiving said converted electrical signals;
    generating, by the second device, one data of a second type based on said one data of the first type received using the one or more first channels over the first communication link and converting said generated data of said second type into optical signals having said second data type using an electrical-to-optical conversion element;
    transmitting, by the second device, said optical signals having said one data of the second type using a dedicated low-latency back channel of one or more second channels over the first communication link, said optical signals having said one data of the second type propagating in said dedicated back channel in a direction opposite to said optical signals transmitted in said forward direction over said first channels in the first communication link;
    receiving, by the first device, said one data of the second type using the one or more second channels over the first communication link; and
    generating, at said second device, another data of the first type, and converting said generated another data of said first type into optical signals having said another data of the first data type using electrical-to-optical conversion elements;
    transmitting and multiplexing, by the second device, said optical signals having said another data of the first type using one or more third channels over the second communication link, the second device having a transmitter drive circuit for driving said optical signals of said another first data type,
    receiving, by the first device, said optical signals having said another data of the first type using the one or more third channels over the second communication link;
    generating, by the first device, optical signals having another data of the second type based on said another data of the first type received using the one or more third channels over the second communication link;
    transmitting, by the first device, said optical signals having said another data of the second type using a dedicated low-latency back channel of one or more fourth channels over the second communication link; and receiving, by the second device, said optical signals having another data of the second type using the dedicated back channel of said one or more fourth channels over the second communication link, and converting said received optical signals having said another data of said second type into electrical signals using an optical-to-electrical conversion element, wherein said transmitter drive circuit for driving said optical signals of said another first type data is further configured to drive said electrical-to-optical conversion element used for generating said optical signals having said second data type, and said receiver driver circuit for receiving said optical signals having the first data type is further configured to drive said optical-to-electrical conversion element for generating said electrical signals having said another data of said second data type.

2. The method of claim 1, wherein said one data of the second type is more sensitive to latency than said one data of the first type.

3. The method of claim 1, wherein the communication link comprises at least one of an optical fiber, an optical waveguide, an electrical cable, and a printed circuit board trace.

4. The method of claim 1, wherein the multiple channels are respectively channels in a wavelength-division multiplexed (WDM) streams.

5. The method of claim 1, wherein the multiple channels are respectively channels in a space-division multiplexed (SDM) streams.

6. The method of claim 1, wherein the multiple channels are respectively modes in a multimode fiber.

7. The method of claim 1, wherein each of said one and another data of the first type comprises payload information, and each of said one and another data of the second type comprises flow control information.

8. The method of claim 1, wherein each of said one and another data of the first type comprises a request or query message, and each of said one and another data of the second type comprises a response message to the request or query message.

9. The method of claim 1, wherein a number of the one or more first channels is equal to or greater than a number of the one or more second channels, and wherein a number of the one or more third channels is equal to or greater than a number of the one or more fourth channels.

10. The method of claim 1, wherein said second device operates according to a unidirectional mode of operation wherein no data of second type is transmitted, the method further comprising:

configuring an optical switch to connect an output port of the electrical-to-optical conversion element to an input port of a multiplexor used for said transmitting and multiplexing, by the second device, said optical signals having said another data of the first type using one or more third channels over the second communication link.

11. The method of claim 10, wherein said method further comprises:

connecting, using said optical switch, an output port of a demultiplexor used for said receiving and demultiplexing, by the second device, said optical signals having said one data of the first type using the one or more first channels over the first communication link to an input port of the optical-to-electrical conversion element.

12. The method of claim 1, wherein said second device operates according to a bi-directional mode of operation, the method further comprising:

configuring an optical switch to connect an output port of the electrical-to-optical conversion element to an input port of the demultiplexor used for said receiving and demultiplexing, by the second device, said optical signals having said one data of the first type using the one or more first channels over the first communication link.

13. The method of claim 12, further comprising:

configuring an optical switch to connect an output port of the optical-to-electrical conversion element to an output port of the multiplexor used for said transmitting and multiplexing, by the second device, said optical signals having said another data of the first type using one or more third channels over the second communication link.

* * * * *